United States Patent
Bourke et al.

(10) Patent No.: US 11,769,110 B1
(45) Date of Patent: Sep. 26, 2023

(54) SYSTEMS AND METHODS FOR OPERATOR MOTION MANAGEMENT

(71) Applicant: Amazon Technologies, Inc., Seattle, WA (US)

(72) Inventors: Jane Margaret Bourke, Seattle, WA (US); Elisha Gallaudet, Andover, MA (US); Cara Held, Groveland, MA (US); Brandon Kwok, Wakefield, MA (US); Nan Ma, Cambridge, MA (US); Audra Snider Merkel, Seattle, WA (US); Bradley John Saviello, Issaquah, WA (US); Megan Tranter, Mercer Island, WA (US); Steven Wilson, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 16/752,546

(22) Filed: Jan. 24, 2020

Related U.S. Application Data

(60) Provisional application No. 62/800,309, filed on Feb. 1, 2019.

(51) Int. Cl.
*G06Q 10/087* (2023.01)
*G06Q 10/0631* (2023.01)

(52) U.S. Cl.
CPC ....... *G06Q 10/087* (2013.01); *G06Q 10/0631* (2013.01); *G06Q 10/063112* (2013.01)

(58) Field of Classification Search
CPC ............. G06Q 10/087; G06Q 10/0631; G06Q 10/063112
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 10,919,152 B1* | 2/2021 | Kalouche | B25J 9/1697 |
| 11,006,860 B1* | 5/2021 | Amit | A61B 5/7275 |
| 2015/0294483 A1* | 10/2015 | Wells | G06T 7/292 |
| | | | 382/103 |
| 2019/0046836 A1* | 2/2019 | Starkey | G01S 17/89 |
| 2022/0227013 A1* | 7/2022 | Vu | F16P 3/147 |

OTHER PUBLICATIONS

"Ergo Risk Assessment: Fast, Simple, and Accurate Risk Assessment", KineticaLabs, Available Online at: http://kineticalabs.com/solutions/ergo-risk-assessment, Accessed from Internet on Apr. 13, 2020, 4 pages.

\* cited by examiner

*Primary Examiner* — Dylan C White
(74) *Attorney, Agent, or Firm* — Kilpatrick Townsend & Stockton LLP

(57) ABSTRACT

Systems and methods are provided herein for performing one or more actions based on kinematic data. An operator management module may obtain video input data depicting a two-dimensional representation of a subject during performance of an activity. A set of points of the subject may be identified based at least in part on a machine-learning model. A 3D representation of the subject may be generated based at least in part on the points identified. Kinematic data related to the subject may be generated utilizing the 3D representation of the subject. Any suitable number of suggested actions may be performed based at least in part on the kinematic data.

20 Claims, 7 Drawing Sheets

SYSTEMS AND METHODS FOR OPERATOR MOTION MANAGEMENT

CROSS REFERENCE TO RELATED APPLICATIONS

This application claims priority to and is a nonprovisional of U.S. Provisional Application No. 62/800,309, filed Feb. 1, 2019, and titled "SYSTEMS AND METHODS FOR OPERATOR MOTION MANAGEMENT", the contents of which are herein incorporated in its entirety.

BACKGROUND

Modern inventory systems, such as those in mail order warehouses, supply chain distribution centers, airport luggage systems, and custom-order manufacturing facilities, often utilize human personnel to perform various tasks (e.g., picking/stowing of items within a warehouse). It may be beneficial to improve the environments for a variety of reasons. Some conventional assessment tools only analyze motion at a particular point in time and do not consider the dynamic motion of an individual over a time period. Additionally, conventional techniques for collecting motion data typically require that the individual wear a sensor or other device, which can be intrusive, cumbersome, and is not ideal for at least scalability reasons.

BRIEF DESCRIPTION OF THE DRAWINGS

Various embodiments in accordance with the present disclosure will be described with reference to the drawings, in which.

DETAILED DESCRIPTION

Figure 1:
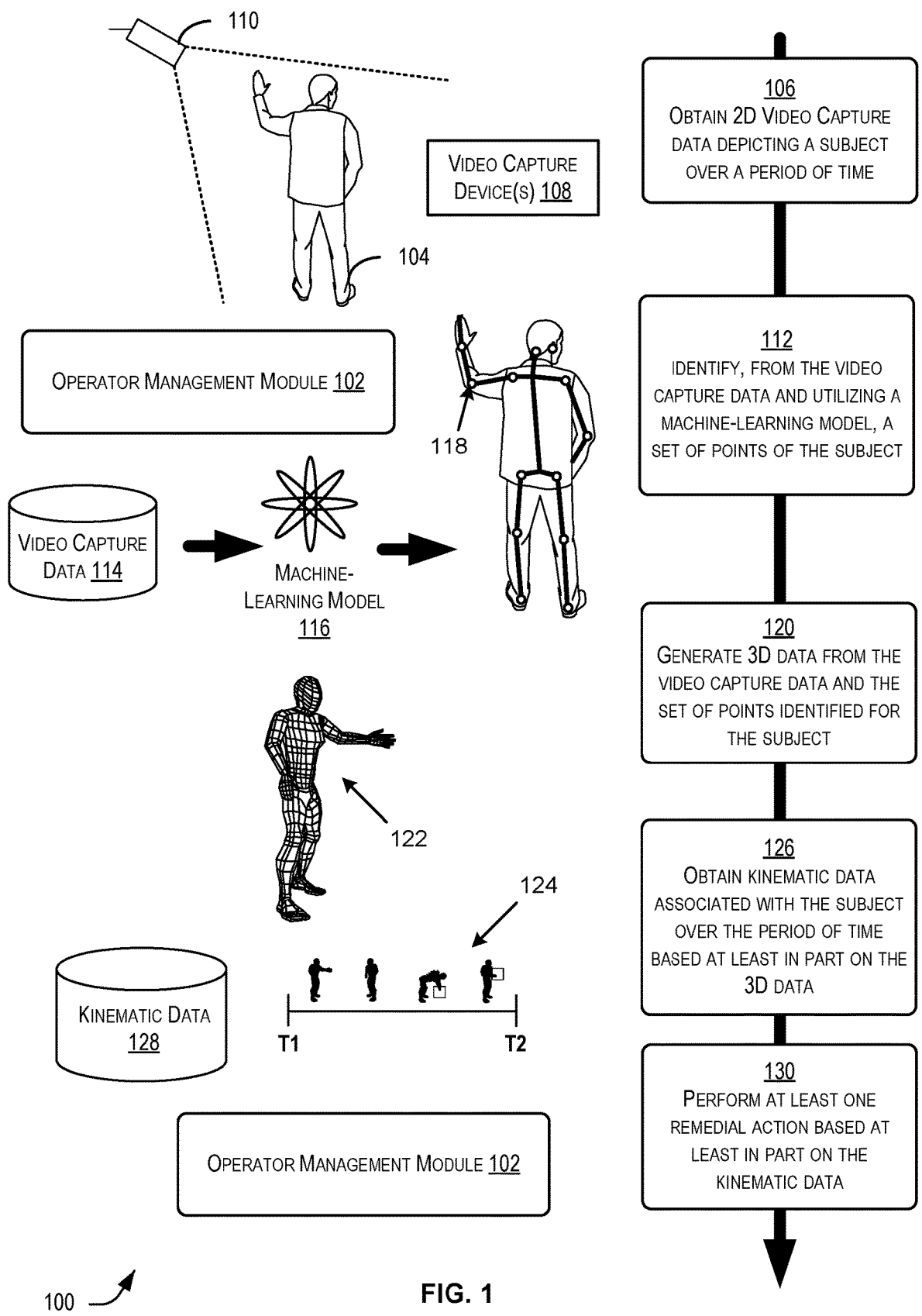
FIG. 1 illustrates an example method for utilizing an operator management module.

Techniques described herein are directed to systems and methods for performing suggested actions based at least in part on the motions/gestures/poses of the operators within the workspace. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, supply chain distribution centers, airport luggage systems, grocery stores, and custom-order manufacturing facilities, to name a few. It should be appreciated that in any of the examples provided herein, the operator may be enabled to opt-in to utilize the functionality provided herein. The user may further opt-out at any time and may have full freedom regarding data collection and/or retention and/or data utilization.

In at least one embodiment, a workspace operator may perform various activities within a workspace (e.g., a warehouse, a fulfillment center, etc.). By way of example, the subject may perform picking and/or stowing activities within a sub-area of the workspace (referred to as a "workstation"). A number of capture devices may be placed within the workspace (e.g., within the workstation) and configured to capture input data during performance of these activities. By way of example, three video cameras may be placed in various locations of a workstation in order to capture video from multiple views. The cameras placement may be predetermined.

Over time, the capture devices may store and/or transmit the captured data. In some embodiments, an operator management module may retrieve the video data and provide the video data as input into a machine-learning model. This machine-learning model may be previously trained utilizing any suitable machine-learning techniques (e.g., neural networks, supervised learning, unsupervised learning, etc.) to identify a set of points (e.g., body parts and/or joints) of a subject from 2-dimensional (2D) input (e.g., video, an image, etc.). As a non-limiting example, the machine-learning model may be a convolutional pose machine (CPM) that has been previously trained to identify a set of joints and/or body parts based at least in part on a set of images/videos for which these joints/parts are known. In some embodiments, a convolutional pose machine may include a sequence of convolution networks that repeatedly produce 2D belief maps for locating each joint/part. Image features and believe maps produced in one stage of the CPM may be utilized as input into the next, such that the CPM may learn spatial models of the relationships between joints/parts.

The video data and the set of joints/points identified from the video data may be utilized to generate a three-dimensional (3D) representation (e.g., a 3D model) of the subject. In some embodiments, the video data and/or the set of joint/points may be converted from 2D space to 3D space utilizing any suitable conversion technique. By way of example, the 3D representation may be generated by converting the video data and/or the set of joints/points utilizing any suitable computer vision triangulation algorithm. The 3D representation may depict the subject's motions over a period of time during performance of his activities. Utilizing the 3D representation, various kinematic data may be collected. By way of example, a number of joint angles formed by the identified joints may be determined. The subject's height may be estimated, Velocities associated with motions performed by the subject may be calculated. Hold durations corresponding to periods of time during which the subject holds an object may be calculated. A frequency corresponding to a particular type of motion (e.g., bending over, reaching over one's head, etc.) may be calculated. The 3D representation may be utilized to identify any suitable kinematic data corresponding to motion of the subject.

The kinematic data and/or the 3D representation may be analyzed to calculate an assessment score. In some embodiments, the assessment score may quantify a degree of risk for injury and/or fatigue based on the motions performed by the subject (as depicted by the 3D representation). In some cases, the assessment score may be calculated based at least in part on other factors such as the subject's height, item attributes associated with an item (e.g., a package) with which the subject interacts with in the performance of his activities, past activities performed by the subject or other subjects, past assessment scores associated with the subject, or the like. The assessment score may be calculated according to any suitable scoring protocol (e.g., a predetermined scoring protocol). Based at least in part on the assessment score, the operator management module may be configured to cause one or more suggested actions to be performed. For example, the operator management module may cause modification of: a rate at which the subject performs activities, a rate at which other components of the system (e.g., mobile drive units that bring items to the subject) perform various tasks, the actual tasks assigned to the subject, etc. Thus, in some embodiments, the management of various components of the system may be controlled and/or changed in a manner that is transparent to the workspace operator.

The operator management module may be configured to provide a user interface and/or a report detailing the motions conducted by the subject as determined above, one or more portions of the input data (e.g., the video data), one or more portions of the 3D representation, the assessment score, historical assessment scores, and/or any suitable data related to subject. This user interface and/or report may be in any suitable form. In some embodiments, the report and/or any data listed above may be provided via any suitable electronic means such as electronic mail, text message, via a network page hosted by the operator management module (or another system), and the like.

In some embodiments, one or more portions of the input data (e.g., the video data), one or more portions of the 3D representation, the motions conducted by the subject as determined above, the assessment score, historical assessment scores, and/or any suitable data may be utilized to determine a design change for any suitable tool, structure, and/or component (e.g., a tool, structure, and/or component with which the subject has interacted). As a simplistic example, it may be the case that the subject has interacted with a table within the workspace during the course of his activities. Utilizing the data outlined above, it may be determined that when interacting with the table, the subject has bent over some number of times to some degree. It may be the case that one or more assessment scores has indicated that the motion and/or frequency of this motion increases a likelihood of injury and/or fatigue to the individual. Accordingly, the operator management module may identify that raising the table an additional five inches would reduce the number of times the subject would bend over, reduce a degree to which the user would be required to bend over, or the like. In some cases, the operator management module may obtain a specification of the table defining the current design/dimensions/placement of the table and/or a modified specification that details a modified version of the design/dimensions/placement of the table (e.g., indicating a height that is five inches higher than the current height of the table). The operator management module may recalculate an assessment score for the modified specification that indicates a likelihood of injury and/or fatigue such that a determination may be made that the modified specification (e.g., increasing the table height by five inches) reduces a likelihood of injury and/or fatigue by at least some threshold amount or results in the likelihood of injury and/or fatigue to the subject to be lower than some threshold value.

By utilizing the techniques discussed herein, activities performed during execution of a task may be determined over a period of time without requiring the subject to wear any physical devices. The input data discussed above may be collected periodically (e.g., every 15 minutes) or continuously (e.g., during a subject work shift) in order to determine ergonomic and/or other changes that may improve the environment in which the subject performs. Workflows may be adjusted in real time according to this data to improve the environment with respect to the subject. Additionally, the techniques discussed herein may enable the system to identify design changes for physical components (e.g., tools, structures, etc.) within the workspace that may also result in an improved workspace. Each of these factors may contribute to increasing an efficiency of the workspace system as a whole, while simultaneously ensuring that the health and safety of the subjects is paramount.

FIG. 1 illustrates an example method 100 for performing a suggested action utilizing an operator management module 102. In some embodiments, the method 100 may enable an assessment of risk of injury and/or fatigue to a subject (e.g., subject 104) in light of the physical activities (e.g., movements, poses, actions) of the subject over a period of time. It should be appreciated that the steps of the method 100 may be performed in any suitable order and may include additional steps not depicted in FIG. 1.

The method 100 may begin at 106, where 2D video capture data depicting a subject 104 over a period of time may be obtained. Although video capture data is used as an example, it should be appreciated that captured data of the subject over time (e.g., infrared data, thermal data, etc.) from any suitable imaging sensor (e.g., digital cameras, thermal imaging devices, infrared imaging devices, magnetic resonance imaging sensors, radiography imaging devices, etc.) may be utilized similarly. In the example depicted in FIG. 1, one or more video capture device(s) 108 (e.g., the video capture device 110) may be utilized to capture video data of the subject 104 over a period of time. In situations in which more than one capture device is utilized. Each capture device (e.g., the video capture device 110) may be situated so as to view the subject 104 from a different angle/vantage. In some embodiments, the specific placement of the video capture device(s) 108 may be predetermined and may depend on the context in which the subject is performing his activities.

At 112, the video capture data 114 may be utilized as input to a machine learning model 116 to identify a set of points (e.g., joints, body parts, portions, etc.) of the subject. For example, the video capture data 114 may be utilized with the machine learning model 116 to identify point 118 depicting the subject's left elbow. The set of points may, for example, identify a nose, neck, right shoulder, right elbow, right wrist, left shoulder, left elbow, left wrist, right hip, right knee, right ankle, left hip, left knee, left ankle, right eye, left eight, right ear, left ear, or any suitable combination of the above. In some embodiments, only a portion of such points are identified while in other embodiments, more points may be identified.

In some embodiments, the video capture data 114 may include one or more videos captured by the video capture device(s) 108 and stored and/or provided directly to the operator management module 102. If more than one video capture device is utilized, the video capture data 114 may include multiple videos each captured from a different vantage point and therefore depicting the subject 104 from a different angle. In some embodiments, the machine learning model 116 may be previously trained utilizing any suitable machine-learning technique (e.g., neural networks, supervised learning, unsupervised learning, etc.) to identify a set of points of the subject 104 from input data (e.g., the video capture data 114). As a non-limiting example, the machine learning model 116 may be a convolutional pose machine that may be utilized to learn image features (e.g., joints, body parts, etc.) corresponding to the subject for the purpose of pose estimation. The machine learning model 116 may process one or more images to extract features of the image to classify specific portions of the image as depicting specific portions of a human being. The machine learning model 116 may be configured to accept 2D image data (e.g., the video capture data 114) as input and output data indicating the locations of specific points (e.g., joints, body parts, portions) of the subject. In some embodiments, each video frame of the video capture data 114 may be provided as input to the machine learning model 116 such that a set of points of the subject may be identified for each frame of the video capture data 114.

At 120, three-dimensional (3D) data may be generated from the video capture data 114 and the set of points (e.g., the point 118) identified at 112. For example, if the video capture data 114 includes more than one video captured from one of a group of video capture devices (e.g., the video capture device(s) 108), the operator management module 102 may utilize any suitable conversion technique to convert the video capture data 114 and/or the set of points identified from 2D space to 3D space. By way of example, any suitable image triangulation algorithm may be used 2D data provided by the video capture data 114 to 3D data corresponding to the 3D representation. An image triangulation algorithm refers to any suitable process for determining a point in 3D space given projections onto two or more images. Example image triangulation algorithms may include a mid-point method, direct line transformation, essential matrix algorithms, and optimal triangulation methods, to name a few. In some triangulation methods, a point in 3D space is projected onto respective image planes determined from the respective camera's focal point. Based on the respective image planes and focal points of the cameras, linear algebra may be utilized to identify an intersection point that may correspond to the point in 3D space.

Utilizing the conversion algorithm(s) discussed above, a 3D representation (e.g., 3D model 122) may be generated to depict the subject over the period of time depicted in the video capture data 114. The set of points identified at 112 may be utilized to identify corresponding sets of points of the 3D representation such that the point 118 (and any other identified points) may be identifiable in the 3D representation. Timeline 124 is intended to depict the 3D model 122 generated to depict the subject 104 over a period of time T1 to T2.

At 126, kinematic data 128 may be obtained. In some embodiments, the kinematic data 128 may be collected utilizing the 3D model 122 depicting the various points of the subject 104 (e.g., the point 118) as the subject 104 performs various activities. By way of example, the 3D model 122 including the identified points may be utilized to calculate kinematic data such as various joint angles of the subject 104 experienced within the time period T1 to T2. As another example, the 3D model 122 including the identified points may be utilized to calculate kinematic data such as hold durations in which a joint angle of the subject 104 is maintained for some period of time and/or over a threshold period of time. As yet another example, the 3D model 122 including the identified points may be utilized to calculate kinematic data such as a number (e.g., frequency) of times a particular motion and/or a particular angle (or range of angles) is experienced by the subject 104 within the time period T1 to T2. It should be appreciated that this type of data (e.g., joint angles, hold durations, frequency of repetition, etc.) may be specific to particular points of the subject 104. Said another way, kinematic data may be calculated for a point identified as an elbow joint (e.g., point 118) as well as for a point identified for a knee joint. Similarly, additional kinematic data may be identified for a hip joint and the like. It should be appreciated that kinematic data may be calculated for each point identified (or a subset of the points identified) and for each frame of the video capture data (or for some of the frames of the video capture data) as desired.

At 130, at least one suggested action may be performed based at least in part on the kinematic data. The particular suggested action(s) performed may vary according to an assessment performed by the operator management module 102 based at least in part on the kinematic data.

In some examples, the kinematic data may be assessed according to a predetermined protocol set. Rules associated with the protocol set may identify a particular degree of risk associated with particular joint angles, hold durations, and/or frequency of particular joint angles (or ranges of joint angles). In some embodiments, rules of the protocol set may be particular to specific points. That is the protocol set may identify that an angle greater than 110 degrees of a left elbow joint (or right elbow joint) incurs some amount of risk of injury and/or fatigue. Similarly, rules of the protocol set may identify that a joint angle greater than 60 degrees of a left hip and/or right hip indicates another amount of risk of injury and/or fatigue. As yet another example, rules of the protocol set may identify a trunk angle (e.g., an angle experienced in the lower lumbar region of the subject 104) that exceeds 30 degrees indicates yet another amount of risk of injury and/or fatigue. The rules of the protocol set may identify that a hold duration (potentially at a particular angle and/or a range of angles) associated with a position of the subject (e.g., as determined from the 3D data and/or the set of points) over a threshold amount of time may incur some degree of risk of injury and/or fatigue. The rules of the protocol set may be numerous and varied. In some embodiments, the rules of the protocol set utilized to identify a degree of risk of injury and/or fatigue may factor in other variables such as specific physical attributes of the subject 104 (e.g., the height of the subject as estimated from the 3D data or as otherwise identified), attributes of an item (e.g., dimensions, a weight, a type of material, etc.) with which the subject 104 interacts (e.g., a package, a tool, etc.), and the like.

The operator management module 102 may utilize the kinematic data (and/or any suitable data such as attributes of the subject 104 and/or attributes of an item with which the subject interacts) to determine the particular suggested action(s) to be performed. As a non-limiting example, the operator management module 102 may notify the subject 104 (e.g., via any suitable electronic means) that a particular gesture, motion, and/or activity previously performed by the subject 104 is ill-advised. In some embodiments, the operator management module 102 may perform a suggested action corresponding to illustrating an alternative motion and/or process of performing the activity (e.g., lift a package while bending your knees) that differs from the manner in which the subject 104 performed the motion/activity in the past. As another example, a workflow associated with the subject 104 may be altered to reduce the likelihood of risk of injury and/or fatigue. Further examples of these types of suggested actions will be discussed in further detail with respect to FIG. 3.

As another example, the operator management module 102 may utilize the assessment of the kinematic data to identify changes to an environment in which the subject 104 performed his various activities. By way of example, the operator management module 102 may be configured to identify that interaction with an object (e.g., a table, a tool, etc.) identified in the video capture data 114, resulted in a motion that increased a risk of injury or fatigue. As a non-limiting example, the operator management module 102 may identify that utilizing a particular table while performing his activities, the subject 104 experienced a particular joint angle (e.g., a lumbar angle indicative of bending over) over a threshold frequency and/or over a threshold period of time. Accordingly, the operator management module 102 may be configured to notify the subject 104 (or another device and/or system) that the object (e.g., the table) should be modified to reduce the risk of injury or fatigue. In some embodiments, the operator management module 102 may estimate (e.g., utilizing any suitable image recognition techniques) a height of the object (or another suitable attribute of the object) in order to calculate a particular manner in which the object should be modified. That is, if the operator management module 102 identifies the table as being of a particular height, it may further calculate a change to the height of the table. In some embodiments, the operator management module 102 may utilize the video capture data 114, the 3D model 122, the set of points, or any suitable combination of the above to identify that by increasing the table by some height (e.g., 3 inches), the subject 104 would have experienced a particular joint angle less frequently (e.g., under a threshold number of times), for less overall time (e.g., under a threshold duration), or not at all. Accordingly, at least one suggested action performed by the operator management module 102 may include notifying the subject 104 (or a device and/or system) that a change should be made to the subject's environment. In some embodiments, the particular change (e.g., raise the table 3 inches) may be included in the notification.

It should be appreciated that only some of the possible suggested actions performable by the operator management module 102 are discussed in connection with FIG. 1. More and different suggested actions are contemplated. The particular suggested action(s) performed by the operator management module 102 may be numerous and may vary according to the context in which the subject 104 performs his activities.

Figure 2:
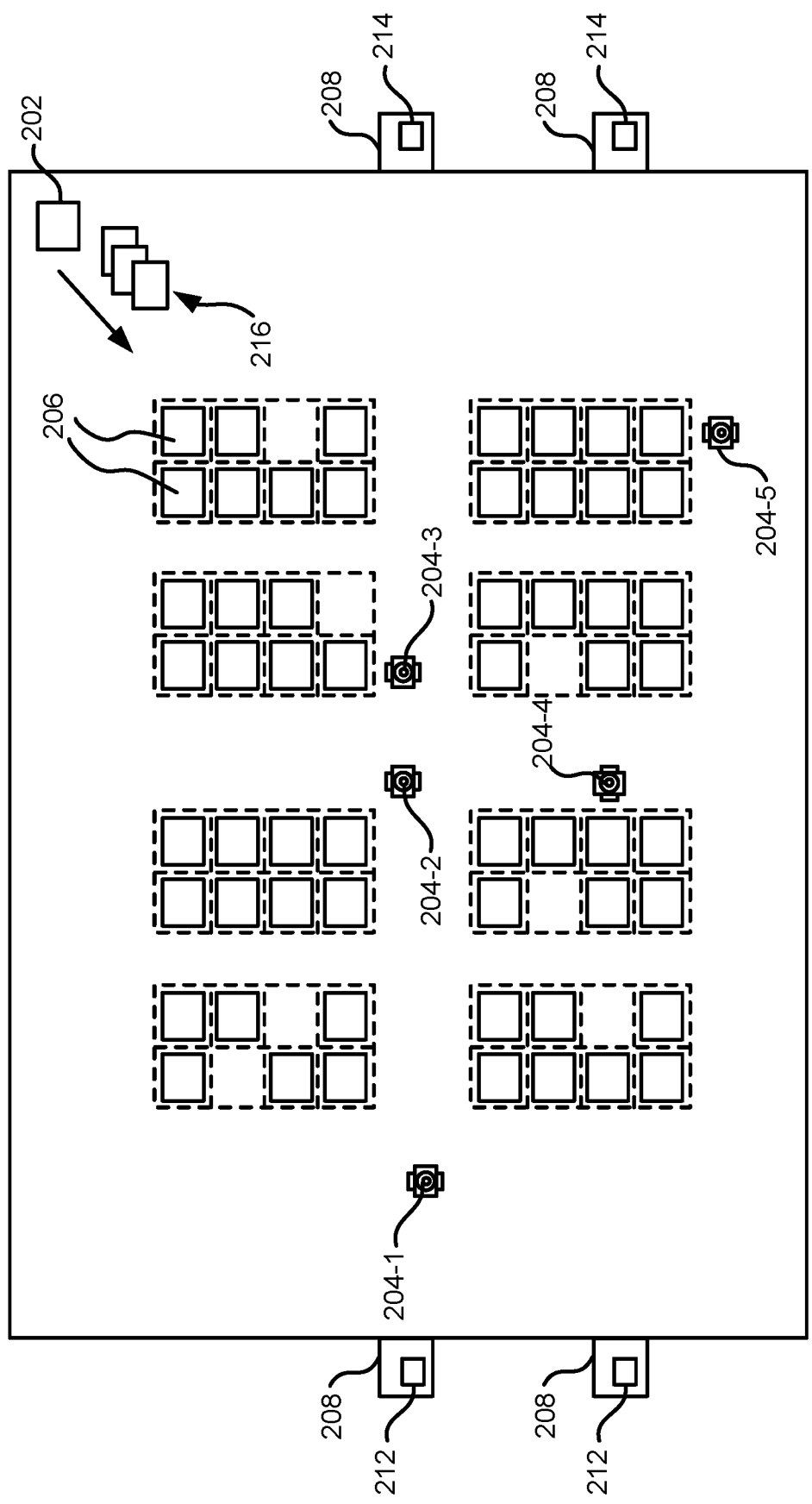
FIG. 2 is a schematic diagram illustrating an example environment suitable for implementing aspects of a workspace management system, in accordance with at least one embodiment.

FIG. 2 is a schematic diagram illustrating an example workspace 200 suitable for implementing aspects of an inventory system, in accordance with at least one embodiment. As a non-limiting example, the inventory system may include a workspace management module 202, one or more mobile drive units (e.g., mobile drive unit 204-1, mobile drive unit 204-2, mobile drive unit 204-3, mobile drive unit 204-4, and mobile drive unit 204-5, hereinafter referred to as "mobile drive units 204"), one or more storage containers 206, and one or more workstations 208 within a workspace 200. In some embodiments, workstations 208 may include one or more operators 212 (also referred to as "workspace operators" or "workstation operators"). The operators 212 may perform a variety of tasks within the workspace 200 including, but not limited to, storing and/or retrieve items from the storage containers 106, cleaning an area of the workspace 200, packing items within a shipping container, taking inventory of the items within workspace 200, managing other operators of the workspace 200, and the like. The specific tasks of the operators 212 may vary depending on the type of workspace and context in which they perform these tasks. The operators may perform these tasks within a workstation 208 or at any suitable location within the workspace 200.

In some embodiments, the mobile drive units 204 may transport storage containers 206 between points within a workspace 200 (e.g., a warehouse, a storage facility, or the like) in response to commands communicated by workspace management module 202. While the workspace management module 202 is depicted in FIG. 2 as being separate from the mobile drive units 204, it should be appreciated that the workspace management module 202, or at least some aspects of the workspace management module 202, may be additionally or alternatively be performed by a processor of the mobile drive units 204. Within the workspace 200, each of the storage containers 206 may store one or more types of inventory items. As a result, the inventory system may be capable of moving inventory items between locations within the workspace 200 to facilitate the entry, processing, and/or removal of inventory items from inventory system and the completion of other tasks involving inventory items.

It should be appreciated that a storage component of the storage containers 206 may be configured with one or more physical markers (QR codes, RFID tags, etc.) that identify a subsection of the storage component. In some embodiments, the workspace management module 202 may maintain a location of stored items based at least in part on an identifier of the storage component and/or an identifier of the subsection of the storage component. Accordingly, tasks for placement of an item may include the identifier of the storage component and the identifier of the subsection of the storage component. Instructions provided to the mobile drive units 204 and/or the computing device associated with the operators 112 may include these identifiers. The mobile drive units 204 and/or computing devices associated with the operators 112 may be configured to read (e.g., via a scanner, or via any suitable sensor) the physical markers of the storage component to identify proper placement of the item within the storage component.

According to some embodiments, the workspace management module 202 may be configured to receive an indication that an item is to be stored within the workspace 200. The workspace management module 202 may determine a storage component (and/or a subsection of a storage component) to store the item. In some embodiments, this determination may be based on at least in part on one or more attributes of the item (e.g., weight, package dimensions, item material, item category (e.g., clothing, fragile, perishable, electronics, etc.), and/or any suitable attribute associated with the item. The workspace management module 202 may further determine a storage component to store the item based at least in part on availability of the mobile drive units 204 to store the item, availability of the operators 112 to store the item, availability of a storage component capable of storing the item, one or more attributes associated with the storage component (e.g., dimensions, available space, etc.), one or more attributes associated with a subsection of the storage component, or any suitable combination of the above.

In accordance with these techniques, the workspace management module 202 may assign tasks to appropriate components of inventory system and coordinate operation of the various components in completing the tasks. The workspace management module 202 may select components of inventory system (e.g., one or more mobile drive units 204 and/or one or more operators 212, etc.) to perform these tasks and communicate appropriate commands and/or data to the selected components to facilitate completion of these operations. In some embodiments, the operators 212 may utilize a computing devices such as a scanner, a smart device, or the like to receive such commands or exchange any suitable information with the workspace management module 202. Although shown in FIG. 2 as a single, discrete component, the workspace management module 202 may represent multiple components and may represent or include portions of the mobile drive units 204 or other elements of the inventory system.

The mobile drive units 204 may move storage containers 206 between locations within the workspace 200. The mobile drive units 204 may represent any devices or components appropriate to move (e.g., propel, pull, etc.) a storage container based on the characteristics and configuration of the storage containers 206 and/or other elements of inventory system. In a particular embodiment of inventory system, the mobile drive units 204 represent independent, self-powered devices configured to freely move about the workspace 200. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 204 represent elements of a tracked inventory system configured to move the storage containers 206 along tracks, rails, cables, crane system, or other guidance or support elements traversing the workspace 200. In such an embodiment, the mobile drive units 204 may receive power and/or support through a connection to the guidance elements, such as a powered rail. Additionally, in particular embodiments of the inventory system the mobile drive units 204 may be configured to utilize alternative conveyance equipment to move within the workspace 200 and/or between separate portions of the workspace 200.

Additionally, the mobile drive units 204 may be capable of communicating with the workspace management module 202 to receive information identifying selection of the storage containers 206, transmit the locations of the mobile drive units 204, or exchange any other suitable information to be used by the workspace management module 202 or the mobile drive units 204 during operation. The mobile drive units 204 may communicate with the workspace management module 202 wirelessly, using wired connections between the mobile drive units 204 and the workspace management module 202, and/or in any other appropriate manner. As one example, particular embodiments of the mobile drive unit 204 may communicate with the workspace management module 202 and/or with one another using 802.11, Bluetooth, or Infrared Data Association (IrDA) standards, or any other appropriate wireless communication protocol. As another example, in a tracked inventory system, tracks or other guidance elements upon which the mobile drive units 204 move may be wired to facilitate communication between the mobile drive units 204 and other components of the inventory system. In general, the mobile drive units 204 may be powered, propelled, and controlled in any manner appropriate based on the configuration and characteristics of the inventory system.

In at least one embodiment, the storage containers 206 store inventory items. The storage containers 206 are capable of being carried, rolled, and/or otherwise moved by the mobile drive units 204. In some embodiments, the storage containers 206 may include a plurality of faces, and each storage component (e.g., a bin, a tray, a shelf, an alcove, etc.) may be accessible through one or more faces of the storage container 206. The mobile drive units 204 may be configured to rotate the storage containers 206 at appropriate times to present a particular face to an operator or other components of the inventory system.

In at least one embodiment, inventory items represent any objects suitable for storage, retrieval, and/or processing in an automated inventory system. For the purposes of this description, "inventory items" (also referred to as "items" or "an item") may represent any one or more objects of a particular type that are stored in the inventory system. In at least one example, the inventory system may represent a mail order warehouse facility (e.g., operated by an electronic marketplace provider), and the items within the warehouse facility may represent merchandise stored in the warehouse facility. As a non-limiting example, the mobile drive units 204 may retrieve the storage containers 206 containing one or more inventory items requested in an order to be packed for delivery to a customer. Moreover, in some embodiments of the inventory system, boxes containing completed orders may themselves represent inventory items.

In particular embodiments, the inventory system may also include one or more workstations 208. The workstations 208 represent locations designated for the completion of particular tasks involving inventory items. Such tasks may include the removal of inventory items from the storage containers 206, the introduction of inventory items into the storage containers 206, the counting of inventory items in the storage containers 206, the decomposition of inventory items (e.g. from pallet- or case-sized groups to individual inventory items), the consolidation of inventory items between the storage containers 206, and/or the processing or handling of inventory items in any other suitable manner, to name a few. In particular embodiments, the workstations 208 may represent the physical locations where a particular task involving inventory items can be completed within the workspace 200. In alternative embodiments, the workstations 208 may represent both the physical location and also any appropriate equipment for processing or handling inventory items, such as robotic arms, scanners for monitoring the flow of inventory items in and out of the inventory system, communication interfaces for communicating with the workspace management module 202, and/or any other suitable components. The workstations 208 may be controlled, entirely or in part, by operators (e.g., the operators 112) or may be fully automated. Moreover, the operators 212 may be capable of performing certain tasks involving inventory items, such as packing, counting, or transferring inventory items, as part of the operation of the inventory system.

In some embodiments, the workstations 208 may include any suitable device configured to receive tasks, instructions, or the like from the workspace management module 202 and to execute operations to perform the task. In some embodiments, the workspace management module 202 may include device instructions with the task assignment to robotic devices 214 of the workstation 208 that causes the robotic devices 214 to execute those device instructions. In some embodiments, the workspace management module 202 may provide a task and the robotic devices 214 of a workstation may be configured with a logic module for determining devices instructions to be executed to perform the task. The robotic devices 214 may include robotic arms, conveyor belts, or any suitable device capable of placing or retrieving an item to and/or from a storage component of the storage containers 206. By way of example, the robotic devices 214 may include robotic arms configured with an end effector such as a suction mechanism, a grasping mechanism, or the like. These robotic devices 214 may be configured to grasp or otherwise manipulate a storage component (e.g., a bin, a tote, a tray, a drawer, etc.) prior to item placement. By way of example, the robotic devices 214 may move and/or remove the storage component of the storage containers 206 such that the storage component is accessible for item placement. The robotic devices 214 may then grasp or otherwise move the item to the accessible storage component and place the storage component (not containing the item) back to the storage container 206. The robotic devices 214 may similarly be configured to remove items from the storage components by manipulating the storage component (e.g., moving the storage component such as pulling a drawer open, or removing the storage component such as removing a tray) to make the item accessible, removing the item from the storage component, and placing the storage component back to its original position within the storage container.

In at least one embodiment, the workspace 200 represents an area associated with the inventory system in which the mobile drive units 204 can move and/or the storage containers 206 can be stored. For example, the workspace 200 may represent all or part of the floor of a mail-order warehouse in which the inventory system operates. Although FIG. 2 shows, for the purposes of illustration, an embodiment of the inventory system in which the workspace 200 includes a fixed, predetermined, and finite physical space, particular embodiments of the inventory system may include a workspace of variable dimensions and/or an arbitrary geometry. While FIG. 2 illustrates a particular embodiment of the inventory system in which the workspace 200 is entirely enclosed in a building, alternative embodiments may utilize the workspace 200 in which some or all of the workspace 200 is located outdoors, within a vehicle (such as a cargo ship), or otherwise unconstrained by any fixed structure.

In operation, the workspace management module 202 may select appropriate components to complete particular tasks and may transmit task assignments 216 to the selected components to trigger completion of the relevant tasks. Each of the task assignments 216 defines one or more tasks to be completed by a particular component (e.g., one or more mobile drive units 204, one or more operators 112, etc.). These tasks may relate to the retrieval, storage, replenishment, and counting of inventory items and/or the management of the mobile drive units 204, the storage containers 206, the robotic devices 214, the operators 212, the workstations 208 and other components of the inventory system. Depending on the component and the task to be completed, a task assignment may identify locations, components, and/or actions/commands associated with the corresponding task and/or any other appropriate information to be used by the relevant component in completing the assigned task.

In particular embodiments, the workspace management module 202 may generate task assignments 216 based, in part, on inventory requests that the workspace management module 202 receives from other components of the inventory system and/or from external components in communication with the workspace management module 202. These inventory requests identify particular operations to be completed involving inventory items stored or to be stored within the inventory system and may represent communication of any suitable form. For example, in particular embodiments, an inventory request may represent a shipping order specifying particular inventory items that have been purchased by a customer and that are to be retrieved from the inventory system for shipment to the customer. After generating one or more of the task assignments 216, the workspace management module 202 may transmit the generated task assignments 216 to appropriate components (e.g., mobile drive units 204, robotic devices 214, computing devices associated with operators 212, etc.) for completion of the corresponding task. The relevant components may then execute their assigned tasks.

With respect to the mobile drive units 204 specifically, the workspace management module 202 may, in particular embodiments, communicate task assignments 216 to selected mobile drive units 204 that identify one or more destinations for the selected mobile drive units 204. The workspace management module 202 may select a mobile drive unit (e.g., mobile drive unit 204-1) to assign the relevant task based on the location or state of the selected mobile drive unit, an indication that the selected mobile drive unit has completed a previously-assigned task, a predetermined schedule, and/or any other suitable consideration. These destinations may be associated with an inventory request the workspace management module 202 is executing or a management objective the workspace management module 202 is attempting to fulfill. For example, the task assignment may define the location of a storage container 206 to be retrieved, a workstation 208 to be visited, or a location associated with any other task appropriate based on the configuration, characteristics, and/or state of inventory system, as a whole, or individual components of the inventory system.

As part of completing these tasks the mobile drive units 204 may dock with and transport the storage containers 206 within the workspace 200. The mobile drive units 204 may dock with the storage containers 206 by connecting to, lifting, and/or otherwise interacting with the storage containers 206 in any other suitable manner so that, when docked, the mobile drive units 204 are coupled to and/or support the storage containers 206 and can move the storage containers 206 within the workspace 200. The mobile drive units 204 and storage containers 206 may be configured to dock in any manner suitable to allow a mobile drive unit to move a storage container within workspace 200. In some embodiments, the mobile drive units 204 represent all or portions of the storage containers 206. In such embodiments, the mobile drive units 104 may not dock with the storage containers 206 before transporting the storage containers 206 and/or the mobile drive units 204 may each remain continually docked with a storage container.

In some embodiments, the workspace management module 202 may be configured to communicate the task assignments 216 to the robotic devices 214 and/or computing devices (e.g., scanners, tablets, smartphones, etc.) associated with the operators 212 to instruct those components to perform one or more tasks. The robotic devices 214, the computing devices associated with the operators 212, and/or the mobile drive units 204 may individually be configured to provide task performance information to the workspace management module 202. Task performance information may include any suitable data related to the performance of an assigned task. By way of example, a mobile drive unit may send task performance information to the workspace management module 202 indicating that the task of moving a particular storage container to a particular station has been completed. A robotic device and/or a computing device associated with a particular operator may transmit task performance information to the workspace management module 202 indicating that an item has been placed in or removed from the selected storage container. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

While the appropriate components of inventory system complete assigned tasks, the workspace management module 202 may interact with the relevant components to ensure the efficient use of space, equipment, manpower, and other resources available to inventory system. As one specific example of such interaction, workspace management module 202 is responsible, in particular embodiments, for planning the paths and managing the speed the mobile drive units 204 utilize when moving within the workspace 200 and for allocating use of a particular portion of the workspace 200 to a particular mobile drive units 204 for purposes of completing an assigned task. In such embodiments, the mobile drive units 204 may, in response to being assigned a task, request a path to a particular destination associated with the task.

Components of the inventory system (e.g., the robotic devices 214, the mobile drive units 204, and/or the computing devices associated with the operators 112) may provide information to the workspace management module 202 regarding their current state, other components of the inventory system with which they are interacting, and/or other conditions relevant to the operation of the inventory system. This may allow the workspace management module 202 to utilize feedback from the relevant components to update algorithm parameters, adjust policies, or otherwise modify its decision-making to respond to changes in operating conditions or the occurrence of particular events.

In addition, while the workspace management module 202 may be configured to manage various aspects of the operation of the components of the inventory system, in particular embodiments, the components themselves may also be responsible for decision-making relating to certain aspects of their operation, thereby reducing the processing load on the workspace management module 202.

Thus, based on its knowledge of the location, current state, and/or other characteristics of the various components of the inventory system and an awareness of all the tasks currently being completed, the workspace management module 202 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system may be able to support a number of techniques for efficiently executing various aspects of the operation of the inventory system. As a result, particular embodiments of the operator management module 102 may enhance the efficiency of the inventory system and/or provide other operational benefits.

Figure 3:
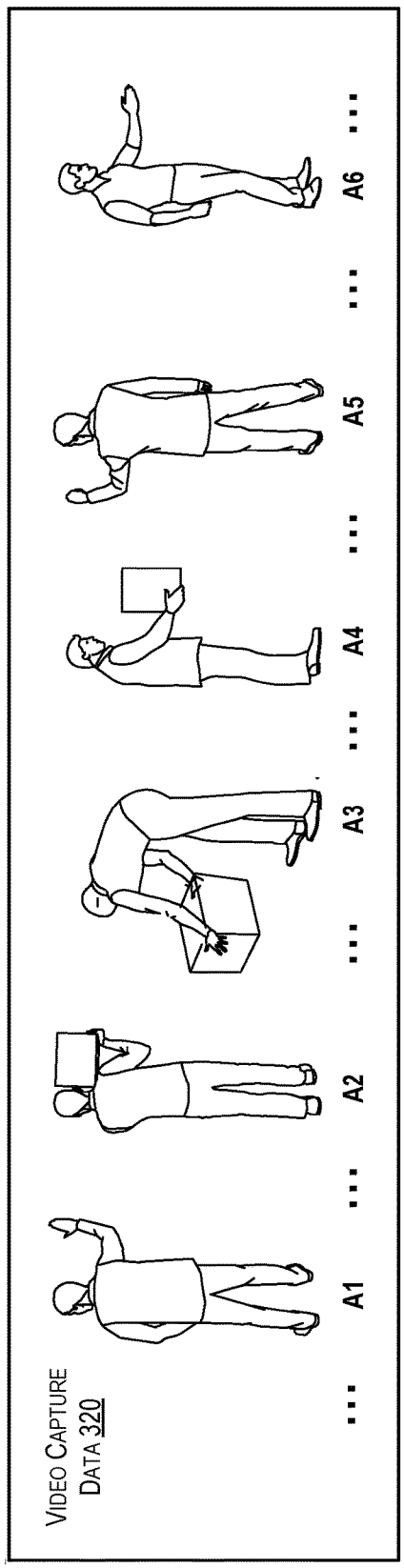
FIG. 3 is a schematic diagram illustrating an example environment suitable for implementing aspects of the operator management module, in accordance with at least one embodiment.
Figure 3:
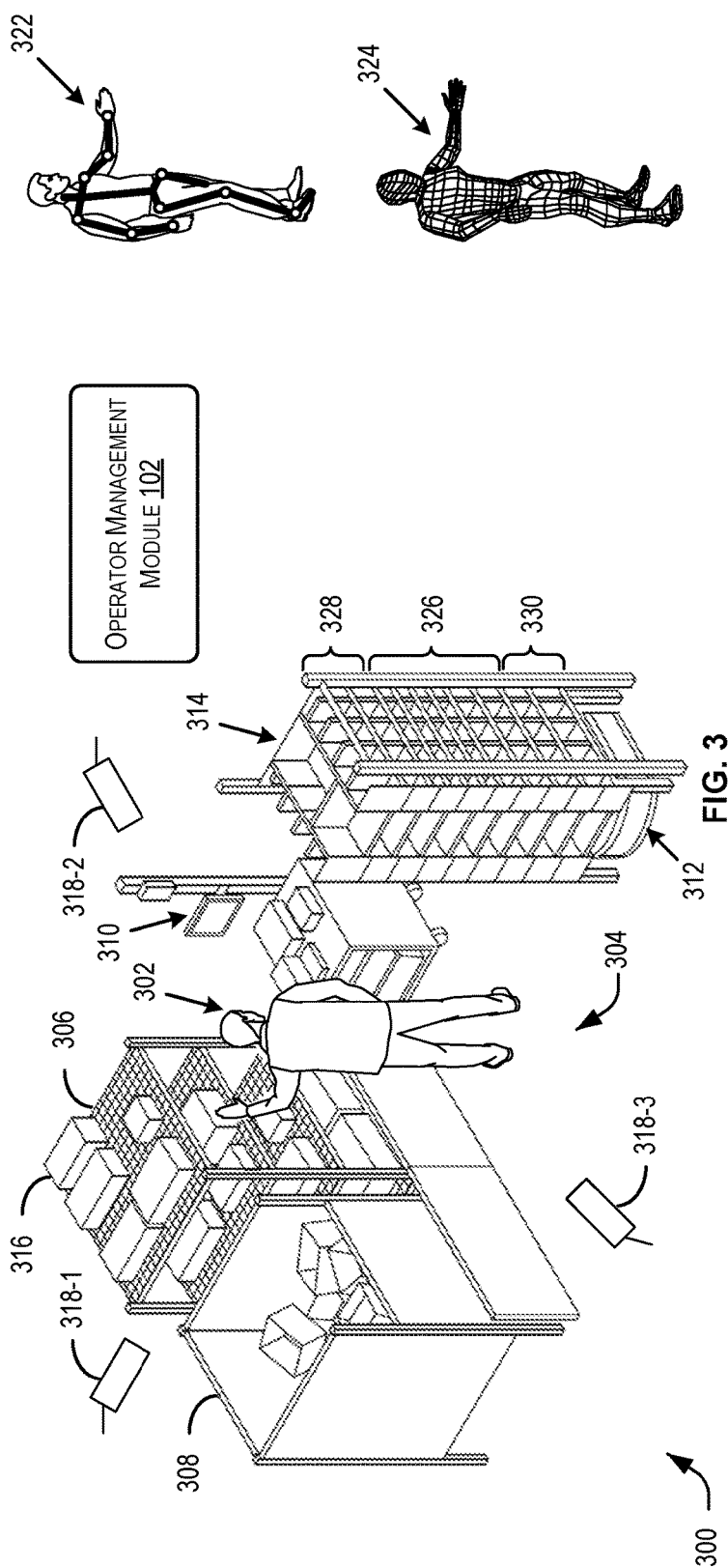

FIG. 3 is a schematic diagram illustrating an example environment 300 suitable for implementing aspects of the operator management module 102 of FIG. 1, in accordance with at least one embodiment. In some embodiments, the subject 302 (e.g., the subject 104 of FIG. 1) may be an operator (e.g., an operator of the operators 212 of FIG. 2) of a workstation 304 (e.g., one of the workstations 208 of FIG. 2).

As a non-limiting example, the workstation 304 (an area within the workspace 200 of FIG. 2) may include any suitable components such as storage rack 306 and a packaging material bin 308, although any number and/or type of components are possible depending on the activities assigned to the subject 302. In some embodiments, the workstation 304 may include user computing device 310, which may operate as part of the workspace 200 of FIG. 2. By way of example, the user computing device 310 may be configured to receive task assignments (e.g., the task assignments 216 of FIG. 2) associated with the subject 302. Generally, the user computer device 310 may perform any suitable operations and interact with the subject 302 and/or the workspace management module 202 of FIG. 2 in any suitable manner to enable the subject 302 to perform a set of activities within the workstation 304. The mobile drive unit 312 (e.g., one of the mobile drive units 204 of FIG. 2) may be configured to perform related tasks such as conveying storage container 314 (e.g., one of the storage containers 206) from another location to the workstation 304. As a non-limiting example, the subject 302 may be tasked with retrieving an item (e.g., item 316) from the storage container 314 or storing the item within the storage container 314.

The workstation 304 may include one or more video cameras (e.g., video capture device(s) 108 of FIG. 1). In the example depicted in FIG. 3, the workstation 304 may include three video cameras (e.g., video camera 318-1, video camera 318-2, and video camera 318-3, collectively referred to as "cameras 318"). The cameras 318 may be individually situated within the workstation 304 according to a predetermined scheme. For example, the cameras 318 may be situated so as to capture video of the subject 302 from three different vantage points. This may enable the cameras 318 to capture video (e.g., the video capture data 114 of FIG. 1) corresponding to different views of the subject 302. The video capture data 320 is intended to depict video captured by one video camera (e.g., the video camera 318-3) over a period of time as the subject 302 performs various activities within the workstation 304. During a particular time period (e.g., a time period during which the video camera 318-3 captures video of the subject 302), the subject 302 may utilize various poses, gestures, and motions. Images A1-A6 are intended to depict some of these poses/gestures/motions as depicted in respective video frames captured by the video camera 318-3. The video from each of the cameras 318 may be stored at a storage location accessible to the operator management module 102 or the captured video may be provided to the operator management module 102 directly or via the user computing device 310.

At any suitable time, (e.g., periodically, upon request, etc.) the operator management module 102 may be configured to obtain the video capture data 320 (and/or any video capture data of the cameras 318). As a non-limiting example, the operator management module 102 may obtain video data corresponding to a last 15 minute interval. As another example, the operator management module 102 may continuously receive the video capture data from the cameras 318 in real-time during a period of time during which the subject 302 is performing various activities within the workstation 304. In some embodiments, the user computing device 310 may be configured to transmit a message to each of the cameras 318 (directly or via a system that is configured to manage the cameras 318) to cause the cameras 318 to begin recording. For instance, when the subject 302 logs into the user computing device 310, the user computing device 310 may transmit a message to each of the cameras 318 to begin recording. The message may include a time period during which recording is to continue (e.g., until 2 PM, for 2 hours, etc.). In some embodiments, the cameras 318 may be configured to continuously record until such time that they receive a message (e.g., from the user computing device 310) to cease recording (e.g., upon the subject 302 logging out of the user computing device 310 or otherwise indicating that his activities within the workstation 304 are concluded).

As the operator management module 102 receives/obtains the video capture data (e.g., the video capture data 320), the operator management module 102 may analyze to identify specific motions, gestures, poses which indicate an increased risk of injury and/or fatigue to the subject 304. By way of example, the method 100 described above in connection to FIG. 1 may be employed to utilize the video capture data 320 (e.g., each frame of the video capture data 320 including the images A1-A6) to identify a set of points (e.g., points 322) of the subject 302. The identification of the set of points may utilize a machine learning model as described herein. The various instances of video capture data (e.g., including the video capture data 320) may be converted utilizing any suitable conversion technique (e.g., an image triangulation methods, mathematical conversion, etc.) to generate 3D data (e.g., the 3D model 324) and the set of points 322 may be included in such 3D data.

Utilizing the 3D data, the operator management module 102 may perform any suitable operations to assess a degree of risk of injury and/or fatigue with respect to the subject 302. In some embodiments, the operator management module 102 may calculate a number of assessment scores corresponding to a number of different risk factors. For example, an assessment score may be generated that quantifies a degree of risk (e.g., a likelihood of risk of injury and/or fatigue) based at least in part on any suitable number of joint angles experienced by the subject 302 during the performance of his activities. Another assessment score may be generated that quantifies a degree of risk (e.g., a likelihood of risk of injury and/or fatigue) based at least in part on a duration of time during which a joint angle (or range of angles), and/or a pose in general, was maintained by the subject 302 during the performance of his activities. Another assessment score may be generated that quantifies a degree of risk (e.g., a likelihood of risk of injury and/or fatigue) based at least in part on a frequency in which a joint angle (or a pose in general) was experienced by the subject 302 during the performance of his activities. It should be appreciated that any suitable number of assessment scores may be determined based at least in part on any suitable condition (e.g., post, gesture, motion, angle, etc.) that is determinable from the 3D data. In some embodiments, the operator management module 102 may be configured to combine and/or aggregate multiple assessment scores into fewer assessment scores. For example, the assessment scores above may be combinable (e.g., according to any suitable protocol such as a predetermined weighted algorithm) into a single assessment score.

The operator management module 102 may perform any suitable suggested actions in response to the assessment score(s) and/or the analysis of the 3D data generally. As a non-limiting example, the operator management module 102 may be configured to provide a report indicating one or more (e.g., all) of the motions/poses/gestures of the subject 302 during the last period of time for which video was obtained. In some embodiments, the report may be provided via any suitable electronic means. By way of example, the operator management module 102 may display the report (or a portion of the report, or any suitable combination of data accessible to the operator management module 102) at the user computing device 310. In some embodiments, the report may include a summary of the motions/poses/gestures of the subject 302. In some embodiments, the report may indicate one or more motions/poses/gestures performed by the subject 302 historically (e.g., over the last work month, over the last week, etc.). In some embodiments, the report may include any suitable portion of the video capture data (e.g., any suitable portion of the video capture data 320) and/or any suitable portion of the 3D model 324. For example, the report may present a portion of the video and/or a corresponding motion of the 3D model that corresponds to a motion/gesture/pose for which a degree of risk of injury and/or fatigue exceeded a threshold value. In some embodiments, the operator management module 102 may depict (e.g., via the report or otherwise) an alternative motion/gesture/pose that may be utilized by the subject 302 to reduce risk of injury and/or fatigue.

As another example of a possible suggested action, the operator management module 102 may be configured to cause a workflow associated with the subject 302 to be altered. This may result in a variety of changes to the subject's workflow. By way of example, the operator management module 102 may cause subject 302's task assignment to be modified. This may be accomplished directly by the operator management module 102 or the operator management module 102 may transmit any suitable data to the workspace management module 202 of FIG. 2 to alter the task assignment of subject 302. As a non-limiting example, the operator management module 102 may determine that a lumbar region (e.g., lower back) of the subject 302 has exceeded a threshold angle due the subject 302 bending over some threshold degree. The operator management module 102 may determine that this condition has occurred over a threshold number of times within a given time period (e.g., the last 15 minutes, since the beginning of subject 302's shift, etc.). The operator management module 102 may have assessed these conditions as resulting in one or more assessment scores that exceed one or more threshold values. The operator management module 102 may transmit any suitable data (e.g., the assessment scores, an indication of a change to be made in the task assignment of the subject 302, etc.) to the workspace management module 202 to modify the task assignment of the subject 302.

As a non-limiting example, the workspace management module 202 (or the operator management module 102) may alter the task assignment of the subject 302 to ensure that items are retrieved and/or stored within a storage container within the area 326, and that the areas 328 and 330 are avoided. This may result in the workspace management module 202 identifying storage containers (e.g., the storage container 314) in which space is available within the area 326 and utilizing those identified storage containers for the activities to be performed by the subject 302. The workspace management module 202 may avoid selecting storage containers that do not have space within the area 326. Accordingly, the subject 302 may experience less instances of having to bend over and thus, the risk of injury and/or fatigue may be reduced.

As another non-limiting example of a suggested action, the operator management module 102 may alter (e.g., via the workspace management module 202) a speed at which activities are performed by the subject 302. By way of example, the workspace management module 202 may perform any suitable operations to cause the speed at which the mobile drive unit 312 travels to the workstation 304 to be reduced in order to reduce a speed at which a particular activity (e.g., storage of the item 316 within the storage container 314) may be completed. By causing a reduction in speed of a particular component of the task (e.g., the mobile drive unit 312), the operator management module 102 may effectively cause the subject 302 to reduce speed, thus, reducing a risk of injury and/or fatigue. Additionally, or alternatively, the operator management module 102 may notify the subject 302 (e.g., via the user computing device 310) via visual and/or audio cues that the subject 302 is working to fast and should decrease his speed.

As another non-limiting example of a suggested action, the operator management module 102) may determine (e.g., utilizing video captured by the cameras 318, the 3D data, the set of points 322, etc.) that a component of the workspace should be altered. As a simplistic example, the operator management module 102 may determine that the height of the user computing device 310 has resulted in motions/gestures/poses of the subject 302 that incur some degree of risk to the subject 302 of injury and/or fatigue. For example, the operator management module 102 may determine (e.g., via estimation utilizing the video capture data and/or the 3D model 324) an estimated height of the subject 302 and an estimated height of the user computing device 310. The operator management module 102 may further determine that a difference in these heights may have resulted in a particular motion (e.g., bending over) being performed by the subject 302. In some embodiments, the operator management module 102 may simulate a change in the component (e.g., an increase to the height at which the user computing device 310 is provided) and reassess the risk of injury and/or fatigue to the subject 302 based at least in part on video capture data, the 3D data, the set of points, or the like. This reassessment may occur any suitable number of times and include any suitable number and/or type of changes to the component. The operator management module 102 may determine that by providing the user computing device 310 at a height that is five inches higher than the current height at which the user computing device 310 is provided, reduces and/or eliminates a particular risk of injury and/or fatigue to the user. Said another way, by raising the user computing device 310, the subject 302 would no longer need to bend over to see the display. Accordingly, the risk of the subject 302 experiencing backaches may be decreased. The operator management module 102 may present potential changes to a component of the workstation 304 via the user computing device 310 (or another device and/or system) utilizing any suitable electronic means (e.g., email, text message, a network page configured to display such information, etc.).

It should be appreciated that any suitable combination of the suggested actions discussed above may be performed according to the operations performed by the operator management module 102.

By utilizing the techniques discussed herein, the subject 302 may be observed in order to identify motions/gestures/poses that may increase a likelihood of injury or fatigue. These motions/gestures/poses may be identified without affecting the subject 302. For example, the subject 302 need not wear any physical sensors in order for the assessments of the operator management module 102 to be performed. By utilizing the techniques discussed herein, the operator management module 102 may reduce, if not eliminate, risk of injury and/or fatigue incurred through the motions of the subject 302 and/or as a result of the design and/or configuration/placement of components with which the subject 302 interacts.

Figure 4:
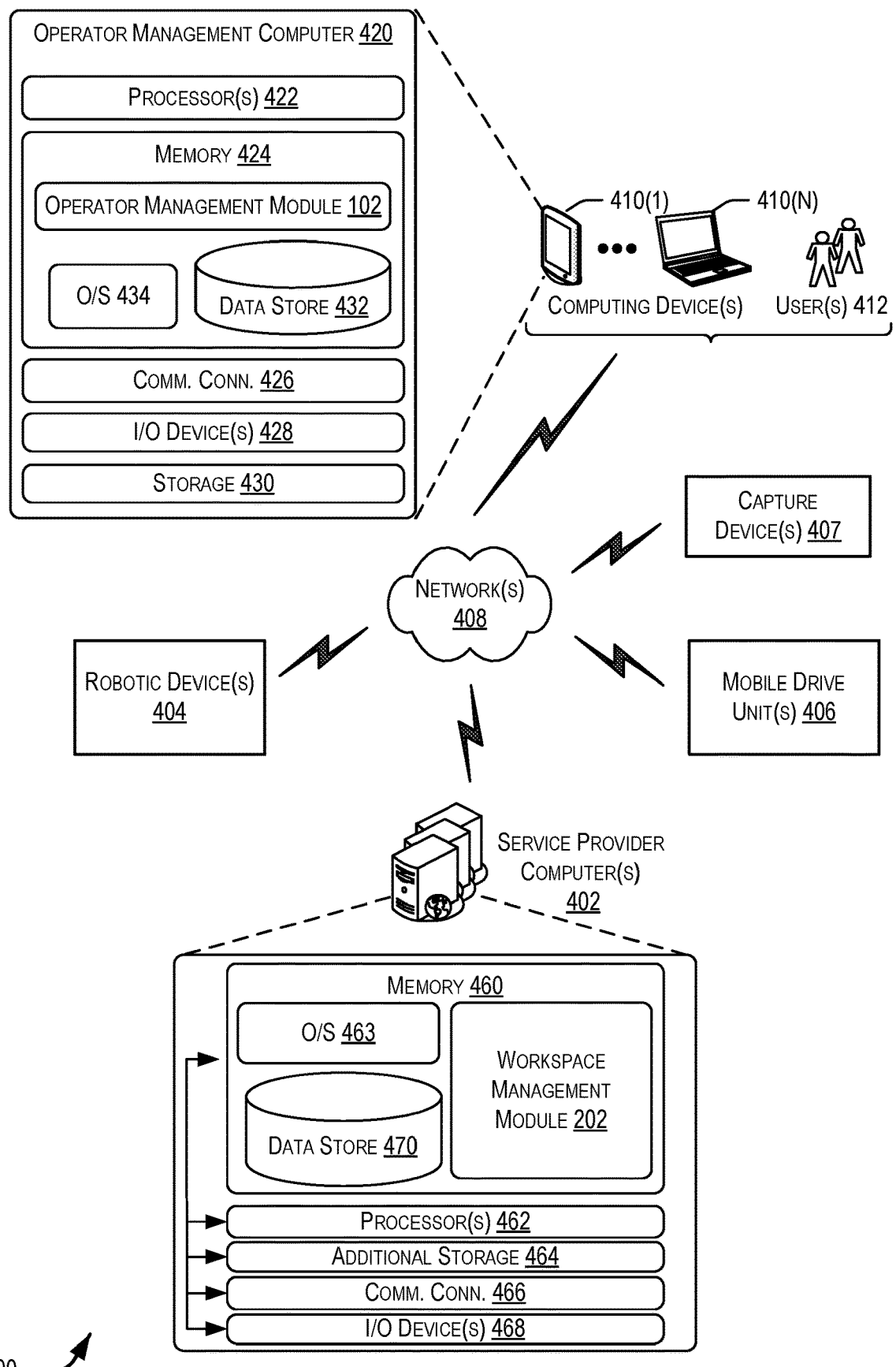
FIG. 4 is an example system architecture for an inventory system, in accordance with at least one embodiment.

FIG. 4 is an example system architecture 400 for an inventory system, in accordance with at least one embodiment. The architecture 400 may include a service provider computer(s) 402. The service provider computer(s) 402 may support an electronic marketplace (not shown) and interface with purchase and delivery services of the electronic marketplace. In this manner, the service provider computer(s) 402 may coordinate receiving, storing, packaging, and shipping of items in a warehouse operated by, or on behalf of, the electronic marketplace provider. In some examples, the service provider computers may be a stand-alone service operated on its own or in connection with an electronic marketplace. In either example, the service provider computer(s) 402 may be in communication with the robotic device(s) 404 (e.g., the robotic devices 214 of FIG. 2) and/or the mobile drive unit(s) 406 (e.g., the mobile drive units 204 of FIG. 2) via one or more network(s) 408 (hereinafter, "the network 408"). The network 408 may include any one or a combination of many different types of networks, such as cable networks, the Internet, wireless networks, cellular networks, radio networks, and other private and/or public networks.

Computing devices 410(1)-410(N) may also be in communication with the service provider computer(s) 402 via the network 408. The computing device(s) 410 may be operable by one or more users 412 (hereinafter, "the users 412") to access the service provider computer(s) 402 via the network 408. The computing device(s) 410 may be any suitable device (e.g., portable or non-portable) capable of communicating with the network 408. For example, the computing devices 410 may be any suitable computing device such as, but not limited to, a mobile phone, a smart phone, a personal digital assistant (PDA), a laptop computer, a thin-client device, a tablet PC, a desktop computer, a scanner, or other computing device. In some embodiments, the computing device(s) 410 (an example of the user computing device 310 of FIG. 3) may operate at a workstation (e.g., workstations 208 of FIG. 2, the workstation 304 of FIG. 3, etc.). The computing device(s) 410 may include similar components provided in the operator management computer 420, including one or more processors 422, memory 424, communication connection(s) 426, input/output (I/O) devices 428, additional storage 430, one or more data stores 432, an operating system 434, and, in particular embodiments, a management module (not depicted) similar to the workspace management module 202. The functionality provided by the workspace management module 202 may similarly be provided by a management module operating on a computing device of the computing devices 410. Likewise, the functionality of workspace management module 202 may similarly be provided by a computing device of the computing devices 410.

Turning now to the details of the operator management computer 420. The processor(s) 422 may be implemented as appropriate in hardware, computer-executable instructions, software, firmware, or combinations thereof. Computer-executable instruction, software or firmware implementations of the processor(s) 422 may include computer-executable or machine-executable instructions written in any suitable programming language to perform the various functions described. The memory 424 may include more than one memory and may be distributed throughout the operator management computer 420. The memory 424 may store program instructions (e.g. associated with the operator management module 102) that are loadable and executable on the processor(s) 422, as well as data generated during the execution of these programs.

Depending on the configuration and type of memory including the operator management module 102, the memory 424 may be volatile (such as random access memory (RAM)) and/or non-volatile (such as read-only memory (ROM), flash memory, or other memory). The memory 424 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 424 may include multiple different types of memory, such as static random access memory (SRAM), dynamic random access memory (DRAM), or ROM. Turning to the contents of the memory 424 in more detail, the memory 424 may include an operating system 434 and one or more application programs, modules or services for implementing the features disclosed herein including at least the operator management module 102. It should be appreciated that any portion of the functionality described herein with respect to the operator management module 102 may be performed by the operator management computer 420 and/or the service provider computer(s) 402.

In some examples, the operator management computer 420 may also include additional storage 430, which may include removable storage and/or non-removable storage. The additional storage 430 may include, but is not limited to, magnetic storage, optical disks, and/or tape storage. The disk drives and their associated computer-readable media may provide non-volatile storage of computer-readable instructions, data structures, program modules, and other data for the computing devices.

The memory 424 and the additional storage 430, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the operator management computer 420. The modules of the operator management computer 420 may include one or more components. The operator management computer 420 may also include communication connection(s) 426 for communicating via network(s) 408 and/or via any suitable communications protocol (e.g., Bluetooth®, Bluetooth Low Energy®, any suitable wireless communications protocol, etc.). The operator management computer 420 may further include input/output (I/O) device(s) 428 and/or ports, such as for enabling connection with a keyboard, a mouse, a pen, a voice input device, a touch input device, a display, speakers, a printer, or other I/O device. The I/O device(s) 428 may enable communication with the other systems such as robotic device(s) 404, service provider computer(s) 402, and/or mobile drive unit(s) 406. In some embodiments, the I/O device(s) 428 may include one or more sensors (e.g., infrared sensors, imaging sensors, etc.) and/or one or more capture device(s) 407. Capture device(s) 407 are intended to be an example of the video capture device(s) 108 of FIG. 1 and/or the cameras 318. Capture device(s) 407 may include one or more: infrared sensors, thermal imaging sensors, digital cameras, video cameras, or any suitable combination of the above. The capture device(s) 407 may also be configured to communicate with any component of the system 400 (e.g., the operator management computer 420, the service provider computer(s) 402, etc.) via the network 408.

The operator management computer 420 may also include data store 432. The data store 432 may include one or more databases, data structures, or the like for storing and/or retaining information associated with the operators 112 of FIG. 1 such as any suitable data related to motion assessment such as one or more images, one or more videos, one or more joints determined from the image(s)/video(s), 3-dimensional (3D) such as a 3D model representing one or more subjects having one or more joints in motion over a period of time, kinematic data associated with the 3D representation, one or more protocol sets associated with suggested actions, and the like.

The service provider computer(s) 402, perhaps arranged in a cluster of servers or as a server farm, may host web service applications. These servers may be configured to host a website (or combination of websites) viewable via the computing devices 410. In at least one example, the service provider computer(s) 402 may be configured to manage the robotic device(s) 404 and/or the mobile drive unit(s) 406 as part of an inventory system (e.g., the inventory system of workspace 200 of FIG. 2). The service provider computer(s) 402 may include at least one memory 460 and one or more processing units (or processor(s)) 462. The processor(s) 462 may be implemented as appropriate in hardware, computer-executable instructions, software, firmware, or combinations thereof. Computer-executable instruction, software or firmware implementations of the processor(s) 462 may include computer-executable or machine-executable instructions written in any suitable programming language to perform the various functions described.

The memory 460 may include more than one memory and may be distributed throughout the service provider computer(s) 402. The memory 460 may store program instructions (e.g., the workspace management module 202) that are loadable and executable on the processor(s) 460, as well as data generated during the execution of these programs. Depending on the configuration and type of memory including the workspace management module 202, the memory 460 may be volatile (such as random access memory (RAM)) and/or non-volatile (such as read-only memory (ROM), flash memory, or other memory). The service provider computer(s) 402 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 460 may include multiple different types of memory, such as static random access memory (SRAM), dynamic random access memory (DRAM), or ROM.

Turning to the contents of the memory 460 in more detail, the memory 460 may include an operating system 463 and one or more application programs, modules or services for implementing the features disclosed herein including at least the workspace management module 202.

In some examples, the service provider computer(s) 402 may also include additional storage 464, which may include removable storage and/or non-removable storage. The additional storage 464 may include, but is not limited to, magnetic storage, optical disks, and/or tape storage. The disk drives and their associated computer-readable media may provide non-volatile storage of computer-readable instructions, data structures, program modules, and other data for the computing devices.

The memory 460 and the additional storage 464, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 402. The modules of the service provider computer(s) 402 may include one or more components. The service provider computer(s) 402 may also include communication connection(s) 466 for communicating via network(s) 408 and/or via any suitable communications protocol (e.g., Bluetooth®, Bluetooth Low Energy®, any suitable wireless communications protocol, etc.). The service provider computer(s) 402 may further include input/output (I/O) device(s) 468 and/or ports, such as for enabling connection with a keyboard, a mouse, a pen, a voice input device, a touch input device, a display, speakers, a printer, or other I/O device. The I/O device(s) 468 may enable communication with the other systems such as robotic device(s) 404, the mobile drive unit(s) 406, and/or the computing device(s) 410. The data store 470 may include one or more databases, data structures, or the like for storing and/or retaining information associated with the service provider computer(s) 402.

Figure 5:
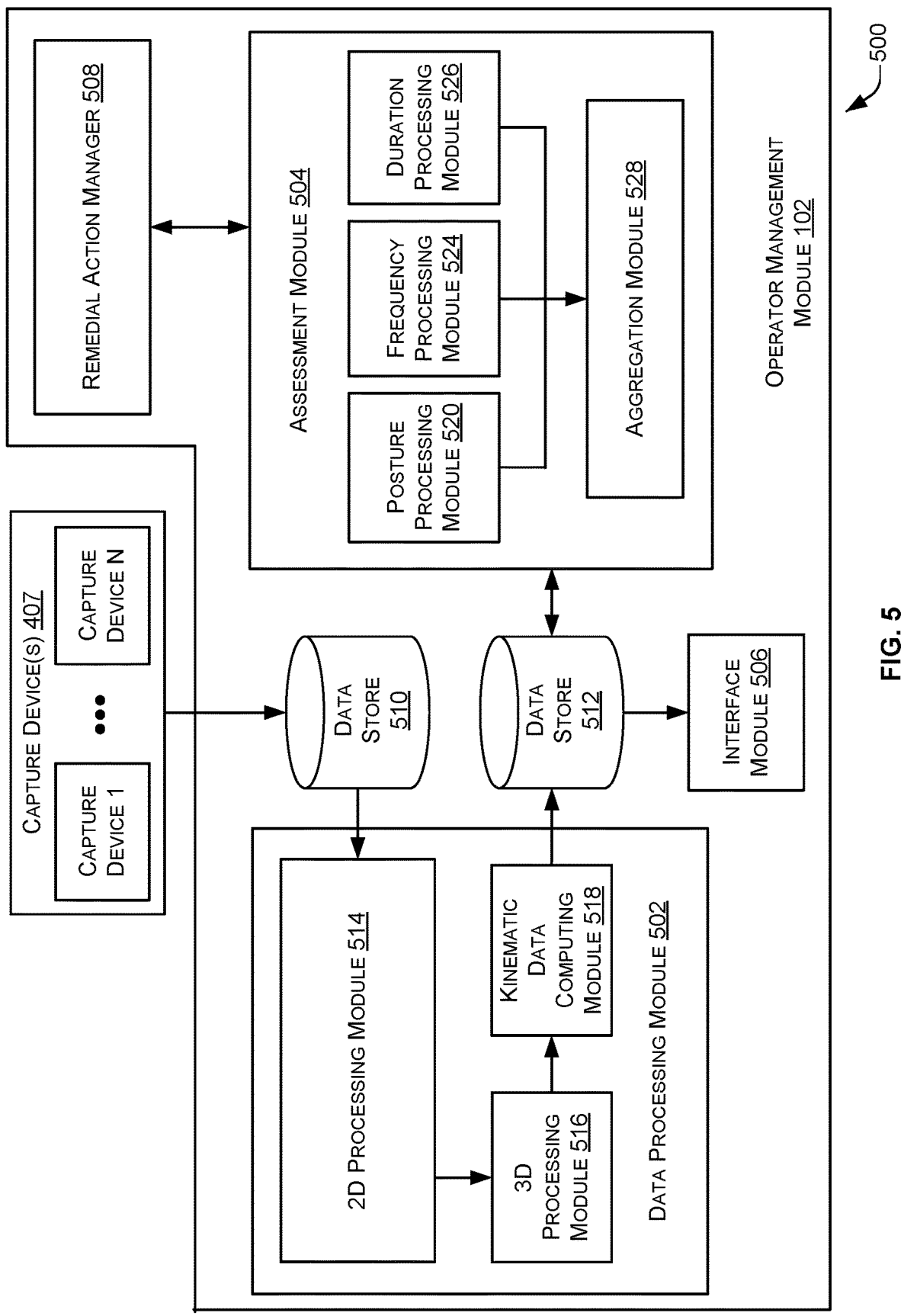
FIG. 5 illustrates in greater detail the components of an operator management module that may be utilized in particular embodiments of the inventory system shown in FIG. 1.

FIG. 5 illustrates in greater detail the components of a particular embodiment of an operator management module 102, according to at least one embodiments. As shown, the example embodiment includes a data processing module 502, an assessment module 504, an interface module 506, and a suggested action manager 508. In general, the operator management module 102 may include any appropriate combination of hardware and/or software suitable to provide the described functionality. It should be appreciated that the modules 502-508 may be provided in any suitable manner, by any suitable number of software and/or hardware module and that the corresponding functionality of each module may be combined and performed by a single module. Data stores 510 and 512, discussed further below, are depicted as being part of the operator management module 102. It should be appreciated that the data store 510 and/or the data store 512 may be separate from, and accessible to, the operator management module 102.

In at least one embodiment, the data processing module 502 may be configured to receive/obtain any suitable data from any suitable source. By way of example, the data processing module 502 may be configured to receive/obtain capture data generated by the capture device(s) 407. The capture device(s) 407 are intended to be examples of any suitable number of the cameras 318 of FIG. 1 and/or the video capture device(s) 108 of FIG. 1. the service provider computer(s) 602, the robotic device(s) 604, the sensor device(s) 614, and the like. In some embodiments, the data processing module 502 may receive/obtain the capture data directly from the capture device(s) 407 or the data processing module 502 may receive/obtain the capture data via the data store 510, a storage device configured to store such information.

The data processing module 502 may be configured to perform a variety of operations utilizing the capture data. In some embodiments, the data processing module 502 may include any suitable number of modules such as a 2D processing module 514. A 3D processing module 516, and a kinematic data computing module 518. It should be appreciated that the functionality described with respect to the modules may be performed by the data processing module 502 alone, or by one or more modules of the data processing module 502.

In some embodiments, the 2D processing module 514 may be configured to identify one or more points from input data (e.g., the data captured by capture device(s) 407). In some embodiments, the 2D processing module 514 may utilize a machine learning model that has been previously trained to identify one or more points (e.g., joints, body parts, portions) of a subject (e.g., the subject 102 of FIG. 1, the subject 304 of FIG. 3, etc.). In some embodiments, the machine learning model may previously trained utilizing any suitable machine-learning technique (e.g., neural networks, supervised learning, unsupervised learning, etc.) to identify a set of points of the subject from a set of training data (e.g., video depicting activities performed by a number of subjects). As a non-limiting example, the machine learning model may be a convolutional pose machine that may be utilized to learn image features (e.g., joints, body parts, etc.) corresponding to the subject for the purpose of pose estimation. The machine learning model may process one or more images of the input data obtained from the data store 510 (or received from the capture device(s) 407) to extract features of the input data (e.g., each frame of a video) to classify specific portions of the image as depicting specific portions of a human being. The machine learning model may be configured to accept 2D image data (e.g., video capture data) as input and output data indicating the locations of specific points (e.g., joints, body parts, portions) of the subject. In some embodiments, each video frame of the the input data captured by capture device(s) 407 may be provided as input to the machine learning model such that a set of points of the subject (or subjects) may be identified for each frame of the video. It may be the case that there are multiple videos available for a subject (or subjects) over the same time period (e.g., as would be the case if multiple capture device(s) 407 were utilized to record the activities of one or more subjects). Accordingly, each video (or suitable input data) may be provided to the machine learning model such that a set of points of the subject (or subjects) may be identified for each frame of each video.

In some embodiments, the 3D processing module 516 may be configured to generate 3D data from the 2D data provided (e.g., the input data captured by the capture device(s) 407). By way of example, the 3D processing module 516 may be configured to utilize any suitable conversion algorithm/technique (e.g., an image triangulation algorithm) to 2D data originally captured by the capture device(s) 407 in 2D space to 3D data. As discussed above, an image triangulation algorithm refers to any suitable process for determining a point in 3D space given projections onto two or more images. Example image triangulation algorithms may include a mid-point method, direct line transformation, essential matrix algorithms, and optimal triangulation methods, to name a few. In some triangulation methods, a point in 3D space is projected onto respective image planes determined from the respective camera's focal point. Based on the respective image planes and focal points of the cameras, linear algebra may be utilized to identify an intersection point that may correspond to the point in 3D space. Utilization of other conversion algorithms is contemplated.

Utilizing the conversion algorithm(s) discussed above, the 3D processing module 516 may be configured to generate a 3D representation (e.g., the 3D model 122) that depicts the subject over the period of time as indicated in the 2D data captured by the capture device(s) 407. The set of points identified by the 2D processing module 514 may be utilized by the 3D processing module 516 to identify corresponding sets of points within the 3D representation such that those points may be identifiable in the 3D representation.

In some embodiments, the kinematic data computing module 518 may be configured to calculate kinematic data utilizing the 3D representation generated by the 3D processing module 516. Utilizing the 3D representation which includes the set of points identified by the 2D processing module 514, the kinematic data computing module 518 may be configured to calculate any suitable kinematic data associated with motions/gestures/poses of one or more subject(s). By way of example, the kinematic data computing module 518 may be configured to calculate a variety of joint angles experience by a subject. The joint angles may be associated with a timestamp or other suitable index identifying a time within the original input data at which the angle was experienced. The log may indicate the particular angle measurement and/or an identifier of the joint(s) involved.

The kinematic data computing module 518 may further be configured to calculate hold durations corresponding to joint angles and/or poses that were maintained by the subject. In some embodiments, the kinematic data computing module 518 may be further configured to calculate a frequency at which a particular motion/gesture/pose was experienced by the subject(s). In some embodiments, the frequency may quantify a number of times the motion/gesture/pose was experienced by a subject. The kinematic data computing module 518 may further be configured to calculate a velocity and/or applied force of a motion/gesture.

The kinematic data (e.g., hold durations, frequencies, joint angles, velocities, forces, etc.) calculated by the kinematic data computing module 518 may be stored within data store 512. It should be appreciated that the input data (e.g., video captured by the capture device(s) 407) may include multiple subjects. In these scenarios, the modules of the data processing module 502 may perform their respective tasks for each subject within the input data. That is sets of points may be identified for each subject (e.g., by the 2D processing module 514), a 3D representation of each subject may be generated (e.g., by the 3D processing module 516), and kinematic data related to each subject may be calculated (e.g., by the kinematic data computing module 518). Any of the data generated by the modules of the data processing module 502 may be stored within the data store 512 for subsequent usage/processing.

The assessment module 504 may be configured to perform a variety of operations utilizing the data store within data store 512 (e.g., the 3D representation of the subject(s), the 2D input data, and/or the kinematic data associated with the subject). In some embodiments, the assessment module 504 may include any suitable number of modules such as a posture processing module 520, a frequency processing module 524, a duration processing module 526 and an aggregation module 528. It should be appreciated that the functionality described with respect to these modules may be performed by the assessment module 504 alone, or one or more modules of the assessment module 504.

The posture processing module 520 may be configured to determine (e.g., utilizing the kinematic data stored in data store 512 or directly received from the data processing module 502) that a particular joint angle has exceeded a threshold value. The posture processing module 520 may utilize any suitable predetermined protocol set to make this determination. In some embodiments, the predetermined protocol set may indicate particular threshold values associated with particular joints. Thus, a determination that a joint angle has exceeded a threshold value may vary depending on the particular joint being assessed. In some embodiments, the posture processing module 520 may be configured to calculate any suitable number of assessment scores quantifying a risk of injury and/or fatigue resulting from the particular joint angle.

The frequency processing module 524 may be configured to determine (e.g., utilizing the kinematic data stored in data store 512 or directly received from the data processing module 502) that a particular joint angle has been exceeded a threshold value a particular number of times. By way of example, the frequency processing module 524 may analyze the 3D representation to count each time a particular joint (e.g., an elbow joint generally, a right elbow joint, a lumbar region of a back, etc.) exceeded a threshold angle value. The threshold angle value may be different depending on the joint being assessed. For example, a threshold angle value for an elbow may be 110 degrees, while a threshold angle for a hip may be 60 degrees, and a threshold angle value for a trunk (e.g., the lower lumbar region of the subject's back) may be 30 degrees. The threshold angle values for each joint may be previously determined and may be stored and identified within a protocol set by which the frequency processing module 524 operates. In some embodiments, the predetermined protocol set may indicate particular threshold frequency values associated with particular joints. That is the frequency processing module 524 may, according to the protocol set, discard data that indicates a particular joint has exceeded a threshold angle value, unless the frequency at which this threshold angle value was exceeded exceeds a threshold number of times (as defined in the protocol set). In some embodiments, the frequency processing module 524 may be configured to calculate any suitable number of assessment scores quantifying a risk of injury and/or fatigue resulting from the frequency at which a particular joint angle is experienced and/or exceeds a threshold value.

The duration processing module 526 may be configured to determine (e.g., utilizing the kinematic data stored in data store 512 or directly received from the data processing module 502) that a particular joint angle or a motion/gesture/pose has been maintained by the subject. In some embodiments, the duration processing module 526 may be configured to discard data indicating a particular joint angle or a motion/gesture/pose has been maintained under a threshold period of time. The duration processing module 526 may identify that specific duration of time during which a particular joint angle or a motion/gesture/pose has been maintained by the subject. The duration processing module 526 may be configured to calculate one or more assessment scores based at least in part on a predetermined protocol set and the specific duration of time during which the particular joint angle or motion/gesture/pose has been maintained by the subject. In some embodiments, the protocol set may define different score calculations depending on the particular joint angle and/or motion/gesture/pose being maintained. By way of example, an assessment score calculated by the duration processing module 526 may indicate a lower risk of injury and/or fatigue for a pose indicating the subjects arm(s) are raised over his head for one minute, than an assessment score calculated based on an indication that the subject was bent over (e.g., 25 degrees) for thirty seconds.

The assessment module 504 may include additional modules (not depicted) for calculating velocity and/or applied forces associated with a motion/gesture/pose of the subject as provided in the 3D data. Any suitable number of modules may be included in the assessment module 504 and each may be configured to calculate any suitable assessment score based on any suitable combination of the kinematic data, 3D data, 2D data, sets of points, etc. of data store 512 and/or received from the data processing module 502. The specific algorithms for calculating assessment scores based at least on joint angles, motion/gesture/pose frequencies, hold durations, velocities, forces, and the like may be previously determined and defined within the protocol set utilized by the posture processing module 520, the frequency processing module 524, and the duration processing module 526.

In some embodiments, the aggregation module 528 may be configured to aggregate any suitable number of the assessment scores calculated by any suitable number of the modules of assessment module 504. In some embodiments, the aggregation module may utilize a predefined weighting algorithm to combine particular assessment scores into an overall assessment score indicating a degree of risk to a subject of injury and/or fatigue.

The interface module 506 may be configured to provide any suitable user interface and/or data related to the kinematic data, the 3D data, the 2D data, and/or the sets of points stored in data store 510 and/or data store 512. As a non-limiting example, the interface module 506 may be configured to provide a graphical user interface (e.g., via the computing device(s) 410 of FIG. 4, the user computing device 310 of FIG. 3, etc.) that provides any suitable combination of the data utilized and/or generated by the data processing module and/or the assessment module 504. By way of example, the interface module 506 may be configured to provide a report indicating one or more (e.g., all) of the motions/poses/gestures of the subject as depicted in the 2D data and/or 3D data. In some embodiments, the report may be provided via any suitable electronic means.

By way of example, the interface module 506 may display the report (or a portion of the report, or any suitable combination of data accessible to the operator management module 102) at the user computing device 310 of FIG. 3. In some embodiments, the report may include a summary of the motions/poses/gestures of the subject(s). In some embodiments, the report may indicate one or more motions/poses/gestures performed by the subject(s) historically (e.g., over the last work month, over the last week, etc.). In some embodiments, the report may include any suitable portion of the 2D data (e.g., any suitable portion of the video capture data 320 of FIG. 3) and/or any suitable portion of the 3D representation (e.g., 3D model 324 of FIG. 3). For example, the report may present a portion of the video and/or a corresponding motion of the 3D model that corresponds to a motion/gesture/pose for which a degree of risk of injury and/or fatigue exceeded a threshold value. In some embodiments, the operator management module 102 may depict (e.g., via the report or otherwise) an alternative motion/gesture/pose that may be utilized by the subject 302 to reduce risk of injury and/or fatigue. Any suitable number and/or combination of the assessment scores calculated by the assessment module 504 (or the modules of the assessment module 504) may be provided.

The interface module 506 may be configured to receive input from a user interface at which the report (or any suitable data of the data store 510 and/or the data store 512) is presented. In some embodiments, the input may indicate a request to decrease a particular risk of injury and/or fatigue and/or to decrease the risk of injury and/or fatigue in general. The input may be transmitted by the interface module 506 to any suitable module depicted in FIG. 5.

The suggested action manager 508 may be configured to perform and/or cause the performance of any suitable number of suggested actions based at least in part on the assessment score(s) provided by the assessment module 504 and/or any suitable data utilized and/or generated by the data processing module 502 and/or stored by the data stores 510 and/or 512. The suggested action manager 508 may perform any suitable operations for identifying changes to components (e.g., tools, structures, etc.) with which the subject interacts as seen in the 2D and/or 3D data. For example, the suggested action manager 508 may utilize any suitable image recognition techniques to analyze the 2D data (e.g., the video provided by the capture device(s) 407) in order to identify components with which the subject interacts). Various attributes of the components may be identified by requesting such data from the workspace management module 202 of FIGS. 2 and 4. In some embodiments, the suggested action manager 508 may be configured to estimate various attributes (e.g., dimensions, configuration, placement) of the various components utilizing any suitable image processing techniques. The suggested action manager 508 may be configured to simulate the modification of these components and may submit a request to the assessment module 504 to reassess the risk to the subject were the modifications to the components to be made. Upon receipt, the assessment module 504 (and/or the various modules of the assessment module 504) may calculate new assessment scores based at least in part to the modifications indicated by the suggested action manager 508. The suggested action manager 508, may determine (e.g., based at least in part on the new assessment score(s) provided by the assessment module 504) that the modifications resulted in reduced risk of injury and/or fatigue (e.g., at least by a threshold amount). Accordingly, the suggested action manager 508 may provide a notification of such modifications via the interface module 506 to any suitable device (e.g., the computing device(s) 410 of FIG. 4). In some embodiments, the suggested action manager 508 may provide the modifications to any suitable system such as the workspace management module 202 of FIG. 4, a configuration system (not depicted) responsible for managing the design and/or configuration/placement of the components identified, etc.

In some embodiments, the suggested action manager 508 may stimulate output (e.g., a report, any assessment score, an alternative motion suggested to the subject, a change to a design/configuration of a component with which the subject interacts, etc.) to be provided by the interface module 506.

The suggested action manager 508 may transmit any suitable data (e.g., the 2D data, the 3D data, one or more assessment scores, one or more actions to be performed based on the data above, etc.) to any suitable system in order to modify the activities of the subject. By way of example, the suggested action manager 508 may be configured to transmit data to the workspace management module 202 to request changes in a workflow and/or task assignment of the subject. In some embodiments, the request may indicate a particular action (e.g., ensure that the subject is not given tasks that utilize areas over a height x or under a height y, reduce the speed at which other components of the system (e.g., mobile drive units) interact with the subject, etc.) to be implemented by the workspace management module 202. In some embodiments, the suggested action manager 508 may transmit data directly to various components (e.g., the user computing device 310 of FIG. 3, the mobile drive unit 312 of FIG. 3, etc.) with which the subject has interacted, is interacting in order to perform a suggested action (e.g., modification of the workflow and/or task of the subject and/or a component related to the workflow and/or task of the subject).

Figure 6:
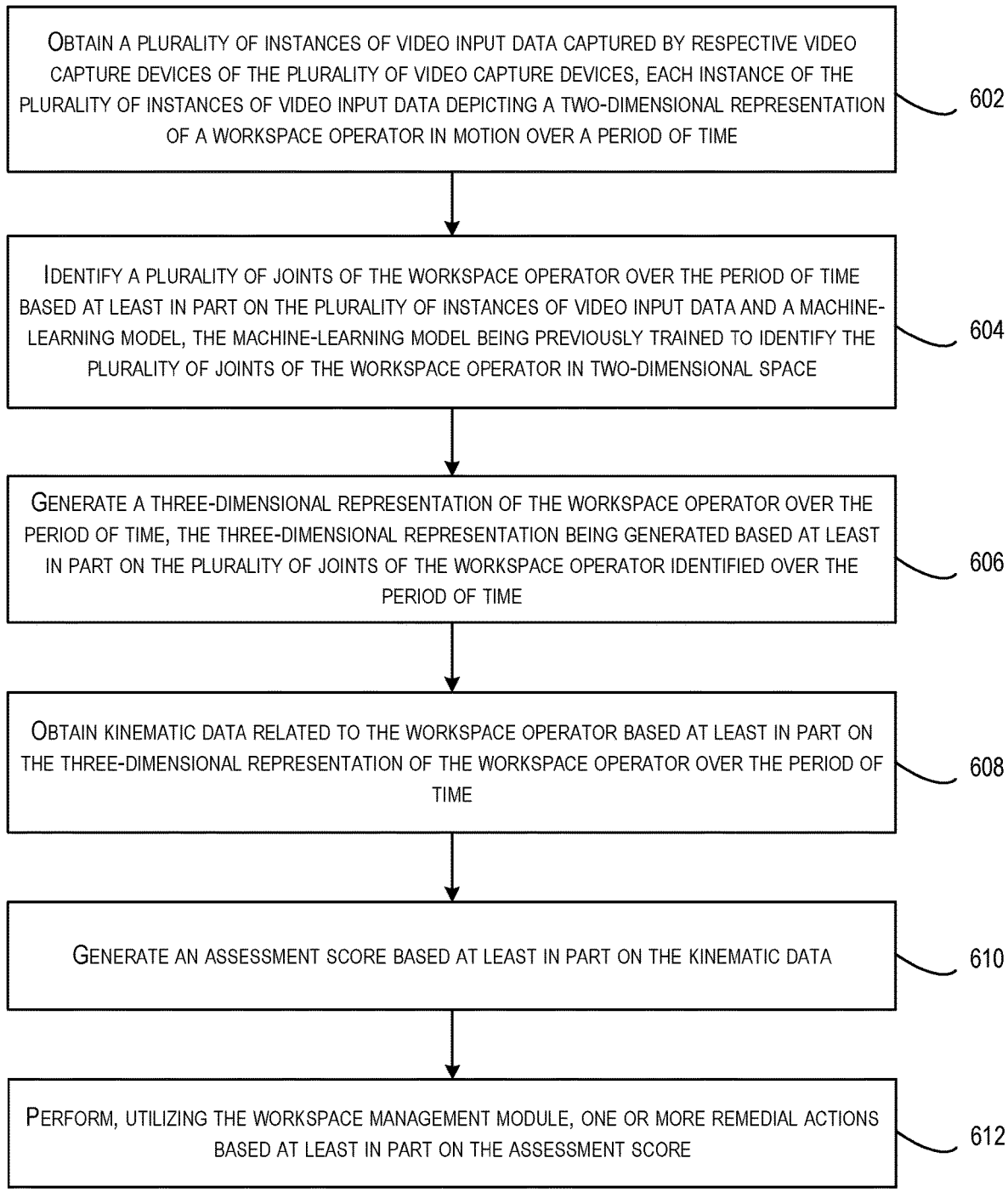
FIG. 6 is a flowchart illustrating an example method for performing one or more suggested actions based at least in part on kinematic data associated with a workspace operator, in accordance with at least one embodiment.

FIG. 6 is a flowchart illustrating an example method 600 for performing one or more suggested actions based at least in part on kinematic data associated with a workspace operator, in accordance with at least one embodiment. The method 600 may be performed by the operator management module 102 of the above figures within a workspace (e.g., workspace 200 of FIG. 2). The workspace may comprise a plurality of video capture devices, a workspace management module (e.g., the workspace management module 202 of FIG. 2) configured to manage activities performed by a plurality of physical components of the workspace and the operator management computer 420 of FIG. 4. The operator management computer may comprise one or more processors and one or more memories configured with computer-executable instructions that, when executed by the one or more processors, cause the operator management computer to perform the method 600. It should be appreciated that the steps of method 600 may be performed in any suitable order. In some embodiments, the method 600 may include more or fewer steps then those depicted in FIG. 6.

The method 600 may begin at 602, where a plurality of instances of video input data may be obtained (e.g., by the data processing module 502). Each of the plurality of instances of video input data may be captured by respective video capture devices of the plurality of video capture devices (e.g., the capture device(s) 407). In some embodiments, each instance of the plurality of instances of video input data may depict a two-dimensional representation of a workspace operator in motion over a period of time.

At 604, a plurality of joints of the workspace operator may be identified (e.g., by the 2D processing module 514 of the data processing module 502 of FIG. 5) over the period of time. The plurality of joints may be identified based at least in part on the plurality of instances of video input data and a machine learning model (e.g., the machine learning model 116 of FIG. 1). In some embodiments, the machine-learning model may be previously trained to identify the plurality of joints of the workspace operator in two-dimensional space.

At 606, a three-dimensional representation of the workspace operator over the period of time may be generated (e.g., by the 3D processing module 516 of the data processing module 502). In some embodiments, the three-dimensional representation may be generated based at least in part on the plurality of joints of the workspace operator identified (e.g., by the 2D processing module 514) over the period of time.

At 608, kinematic data related to the workspace operator may be obtained (e.g., by the kinematic data computing module 518 of the data processing module 502) based at least in part on the three-dimensional representation of the workspace operator over the period of time.

At 610, an assessment score may be generated (e.g., by one or more modules of the assessment module 504 of FIG. 5) based at least in part on the kinematic data. By way of example, the posture processing module 520, the frequency processing module 524, the duration processing module 526, or any suitable combination of the above may generate respective assessment scores. These assessment scores may be combined (e.g., by the aggregation module 528 of FIG. 5) according to a predetermined weighted algorithm.

At 612, one or more suggested actions may be performed (e.g., by the suggested action manager 508 of FIG. 5), utilizing the workspace management module, based at least in part on the assessment score.

Figure 7:
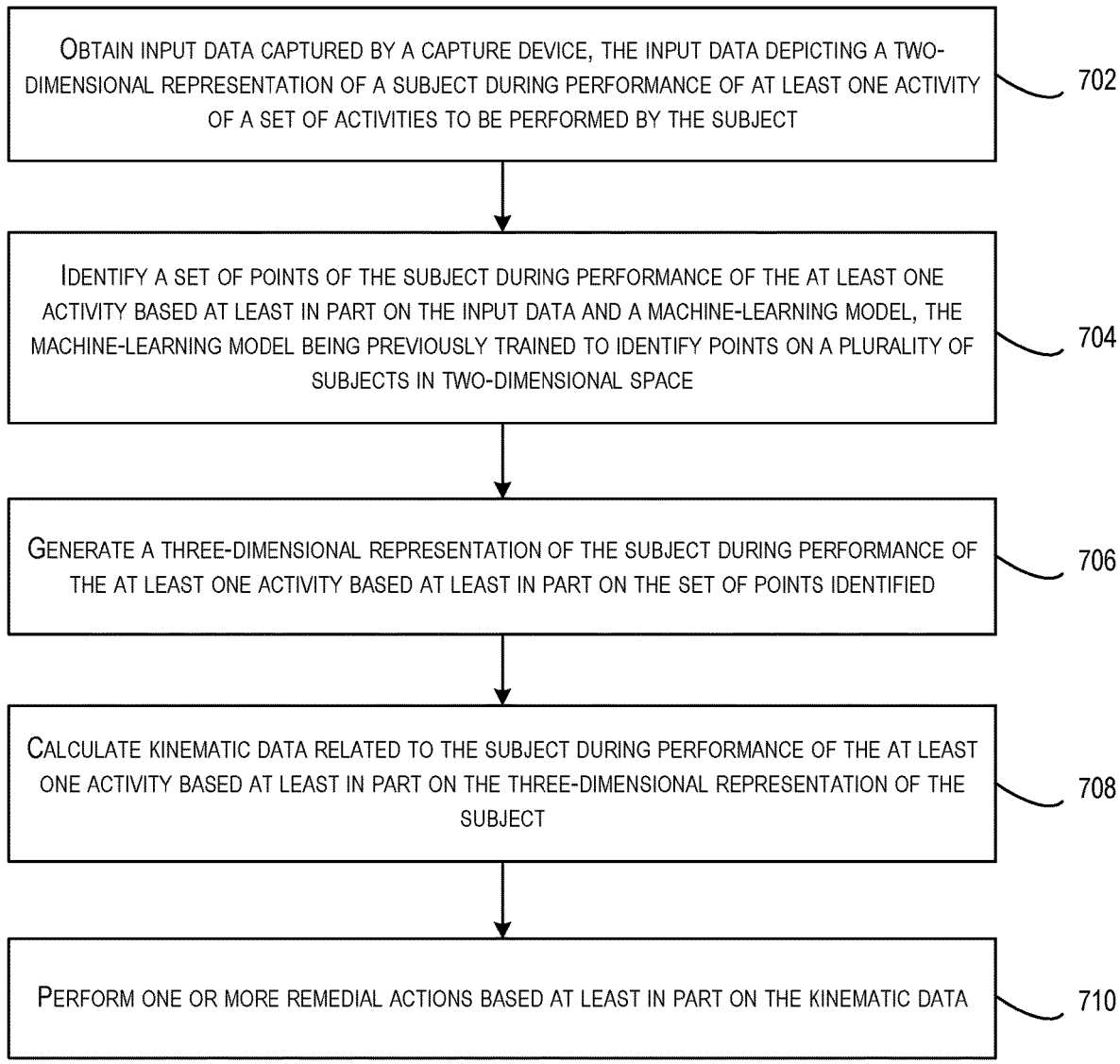
FIG. 7 is a flowchart illustrating another example method for performing one or more suggested actions based at least in part on kinematic data associated with a workspace operator, in accordance with at least one embodiment.

FIG. 7 is a flowchart illustrating another example method 700 for performing one or more suggested actions based at least in part on kinematic data associated with a workspace operator, in accordance with at least one embodiment. It should be appreciated that the steps of method 700 may be performed in any suitable order. In some embodiments, the method 700 may include more or fewer steps then those depicted in FIG. 7. The method 700 may be performed by the operator management module 102 described in the figures above.

The method 700 may begin at 702 where input data captured by a capture device (e.g., the capture device(s) 407) may be obtained (e.g., by the data processing module 502). In some embodiments, the input data may depict a two-dimensional representation of a subject during performance of at least one activity of a set of activities to be performed by the subject.

At 704, a set of points of the subject during performance of the at least one activity may be identified (e.g., by the 2D processing module 514 of FIG. 5) based at least in part on the input data and a machine-learning model. In some embodiments, the machine learning model (e.g., the machine learning model 116 of FIG. 1) may be previously trained to identify points on a plurality of subjects in two-dimensional space.

At 706, a three-dimensional representation of the subject during performance of the at least one activity may be generated (e.g., by the 3D processing module 516 of FIG. 5) based at least in part on the set of points identified.

At 708, kinematic data related to the subject during performance of the at least one activity may be calculated (e.g., by the kinematic data computing module 518 of FIG. 5) based at least in part on the three-dimensional representation of the subject.

At 710, one or more suggested actions may be performed (e.g., by the suggested action manager 508 of FIG. 5) based at least in part on the kinematic data. In some embodiments, the suggested actions may be performed by the suggested action manager 508 through transmission of data to the interface module 506, the workspace management module 202 of FIGS. 2 and 4, or any suitable device and/or system. As a non-limiting example, the suggested action manager 508 may transmit any suitable data to cause the workspace management module 202 to alter at least one of the set of activities to be performed by the subject.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    a plurality of video capture devices within a workspace;
    a workspace management module configured to manage activities performed by a plurality of physical devices of the workspace; and
    an operator management computer comprising:
        one or more processors;
        one or more memories configured with computer-executable instructions that, when executed by the one or more processors, cause the operator management computer to:
            obtain a plurality of instances of video input data captured by respective video capture devices of the plurality of video capture devices, each instance of the plurality of instances of video input data depicting a two-dimensional representation of a workspace operator in motion over a period of time;
            identify a plurality of joints of the workspace operator over the period of time based at least in part on providing the plurality of instances of video input data as input to a machine-learning model, the machine-learning model being previously trained to identify the plurality of joints of the workspace operator in two-dimensional space, the machine-learning model being trained utilizing a supervised learning algorithm and one or more historical images for which a corresponding set of points of a respective subject depicted in the historical image is known;
            update a three-dimensional model of the workspace operator over the period of time, the three-dimensional model being generated based at least in part on the plurality of joints of the workspace operator identified by the machine-learning model;
            calculate a plurality of instances of kinematic data related to the workspace operator based at least in part on the three-dimensional model of the workspace operator as it is updated over the period of time;
            generate an assessment score based at least in part on the plurality of instances of kinematic data; and
            transmit, utilizing the workspace management module, instructions that modify operations of a physical device of the plurality of physical devices of the workspace, the instructions being transmitted based at least in part on the assessment score.

2. The system of claim 1, wherein the plurality of instances of kinematic data comprises at least one of: one or more joint angles of a pose or movement of the workspace operator, a frequency of the pose or movement, a velocity associated the movement, or a duration of the pose.

3. The system of claim 1, wherein executing the computer-executable instructions that cause the operator management computer to generate the assessment score further causes the operator management computer to:
    generate, utilizing a first instance of the plurality of instances of kinematic data, a first score associated with one or more joint angles of a movement of the workspace operator;
    generate, utilizing the plurality of instances of kinematic data, a second score associated with a frequency of the movement over the period of time;
    generate, utilizing a second stance of the plurality of instances of kinematic data, a third score associated with a velocity associated with the movement over the period of time, wherein the assessment score is generated based on a weighted algorithm and the first score, the second score, and the third score.

4. The system of claim 1, wherein executing the computer-executable instructions further cause the operator management computer to perform one or more remedial actions, wherein the one or more remedial actions comprise at least one of: modifying a set of activities performed by the workspace operator, modifying a speed at which the workspace operator performs the set of activities based at least in part on modifying a speed of at least one physical device of the workspace, or identifying a new set of activities for the workspace operator based at least in part on reducing a likelihood of particular movements or particular poses being experienced by the workspace operator.

5. A computer-implemented method performed by an operator management module, the method comprising:
  obtaining video capture data captured by one or more capture devices, the video capture data comprising a plurality of images individually depicting a two-dimensional representation of a subject during performance of at least one activity of a set of activities to be performed by the subject within a workspace;
  identifying a set of points of the subject during performance of the at least one activity based at least in part on providing, to a machine-learning model as input, a subset of images from the video capture data, the machine-learning model being previously trained to identify points on a plurality of subjects in two-dimensional space from at least one image provided as input, the machine-learning model being trained utilizing a supervised learning algorithm and one or more historical images for which a corresponding set of points of a respective subject depicted in the historical image is known;
  updating a three-dimensional model depicting the subject during performance of the at least one activity, the three-dimensional model being updated based at least in part on the set of points identified by the machine-learning model;
  calculating, over a period of time, instances of kinematic data related to the subject during performance of the at least one activity, the instances of kinematic data being calculated based at least in part on updates made to the three-dimensional model depicting the subject over the period of time; and
  transmitting instructions that modify operations of one or more physical devices of the workspace based at least in part on the instances of kinematic data.

6. The computer-implemented method of claim 5, wherein generating the three-dimensional model of the subject utilizes a multiple view triangulation algorithm and the subset of images from the video capture data.

7. The computer-implemented method of claim 5, wherein the set of points comprises a nose, a neck, a right shoulder, a right elbow, a right wrist, a left shoulder, a left elbow, a left wrist, a right area of a hip, a right knee, a right ankle, a left area of the hip, a left knee, a left ankle, a right eye, a left eye, a right ear, and a left ear.

8. The computer-implemented method of claim 5, further comprising:
  generating one or more scores associated with the subject based at least in part on the instances of kinematic data calculated based at least in part on updates made to the three-dimensional model depicting the subject over time; and
  presenting at least the one or more scores utilizing a graphical user interface.

9. The computer-implemented method of claim 8, further comprising:
  identifying an attribute associated with a structure or tool with which the subject interacts, the attribute being identified based at least in part on the video capture data;
  simulating a modification of the attribute;
  calculating modified kinematic data related to the subject during performance of the at least one activity based at least in part on the three-dimensional model of the subject and simulating the modification of the attribute associated with the structure or tool; and
  performing additional operations based at least in part on the modified kinematic data.

10. The computer-implemented method of claim 5, further comprising:
  obtaining a specification corresponding to a tool, a structure, or a component of the workspace; and
  performing operations comprising at least one of 1) identifying a new placement of the tool, the structure, or the component within the workspace based at least in part on the instances of kinematic data calculated over the period of time, or 2) modifying the specification corresponding to the tool, the structure, or the component based at least in part on the instances of kinematic data that were calculated over the period of time.

11. The computer-implemented method of claim 5, further comprising:
  obtaining additional video capture data captured by the one or more capture devices, the additional video capture data comprising a second plurality of images individually depicting two-dimensional representations of the subject during performance of the at least one activity;
  identifying an additional set of points of the subject during performance of the at least one activity based at least in part on providing, to the machine-learning model as input, a second subset of images from the additional video capture data;
  performing an additional update to the three-dimensional model depicting the subject based at least in part on the additional set of points identified by the machine-learning model;
  calculating new instances of kinematic data related to the subject during performance of the at least one activity based at least in part on additional update of the three-dimensional model; and
  performing one or more additional operations based at least in part on the new instances of kinematic data.

12. The computer-implemented method of claim 5, further comprising performing one or more remedial actions, the one or more remedial actions comprising selecting a specific work assignment for the subject based at least in part on the instances of kinematic data, where the instructions are transmitted to the physical device of the workspace, the physical device being configured to execute the instructions to effectuate the specific work assignment.

13. The computer-implemented method of claim 5, further comprising transmitting a notification that operations of one or more components of the workspace have been altered, wherein the notification indicates a reason for making the alteration, the reason being determined based at least in part on the instances of kinematic data.

14. A non-transitory computer-readable storage medium comprising computer-executable instructions that, upon execution by one or more processors, cause one or more processors to perform operations comprising:
  obtaining instances of video capture data captured by one or more capture devices, each instance of video capture data depicting a two-dimensional representation of a subject during performance of at least one activity within a workspace;
  identifying a set of points of the subject during performance of the at least one activity based at least in part on providing the instances of video capture data to a machine-learning model as input, the machine-learning model being previously trained to identify points on a plurality of subjects in two-dimensional space from at least one image provided as input, the machine-learning model being trained utilizing a supervised learning algorithm and one or more historical images for which a corresponding set of points of a respective subject depicted in the historical image is known;

electronically updating a three-dimensional model depicting the subject during the performance of the at least one activity, the three-dimensional model of the subject depicting performance of the at least one activity, the three-dimensional model being updated based at least in part on the set of points identified by the machine-learning model;

calculating, over a period of time, instances of kinematic data related to the subject during performance of the at least one activity, the instances of kinematic data being calculated based at least in part on updates made to the three-dimensional model depicting the subject over the period of time; and transmitting instructions that modify operations of a physical device of the workspace based at least in part on the instances of kinematic data.

15. The non-transitory computer-readable storage medium of claim 14, wherein the at least one activity is a first subset of a set of activites assigned to the subject, and wherein performing the operations comprise altering a second subset of the set of activities based at least in part on the instances of kinematic data.

16. The non-transitory computer-readable storage medium of claim 14, wherein the at least one activity is a first subset of a set of activites assigned to the subject, wherein the set of activities comprises a second subset of the set of activities assigned to the subject, and wherein performing the operations comprises assigning a third set of activites to be performed by the subject in lieu of the second subset of the set of activites.

17. The non-transitory computer-readable storage medium of claim 14, wherein executing the computer-executable instructions cause the one or more processors to perform further operations comprising:

identifying an angle formed by two portions of the three-dimensional model;

determining that the angle exceeds a predetermined threshold value; and calculating an assessment score based at least in part on determining that the angle exceeds the predetermined threshold value.

18. The non-transitory computer-readable storage medium of claim 17, wherein executing the computer-executable instructions cause the one or more processors to perform further operations comprising:

selecting the predetermined threshold value from a plurality of predetermined threshold values based at least in part on the two portions of the three-dimensional model that form the angle.

19. The non-transitory computer-readable storage medium of claim 14, wherein executing the computer-executable instructions to electronically update the three-dimensional model of the subject causes the one or more processors to perform further operations comprising:

converting respective instances of video capture data from two-dimensional space to three-dimensional space, the three-dimensional model being updated based at least in part on the converting.

20. The non-transitory computer-readable storage medium of claim 14, wherein respective capture devices of a plurality of capture devices are placed in different locations to capture images of the subject from different vantage points, wherein updating the three-dimensional model is further based at least in part on triangulating a particular point of the subject based at least in part on respective points identified, by the machine-learning model, from respective images captured by each of the plurality of capture devices.

* * * * *